United States Patent
Pal et al.

(10) Patent No.: US 10,528,688 B1
(45) Date of Patent: Jan. 7, 2020

(54) SYSTEM AND METHOD FOR SCHEMATIC-DRIVEN GENERATION OF INPUT/OUTPUT MODELS

(71) Applicant: Cadence Design Systems, Inc., San Jose, CA (US)

(72) Inventors: Rameet Pal, New Delhi (IN); Taranjit Singh Kukal, Delhi (IN); Rajesh Prasad Singh, Uttar Pradesh (IN)

(73) Assignee: Cadence Design Systems, Inc., San Jose, CA (US)

( * ) Notice: Subject to any disclaimer, the term of this patent is extended or adjusted under 35 U.S.C. 154(b) by 63 days.

(21) Appl. No.: 15/845,322

(22) Filed: Dec. 18, 2017

(51) Int. Cl.
*G06F 17/50* (2006.01)
*G06T 11/60* (2006.01)
*G06F 3/0484* (2013.01)

(52) U.S. Cl.
CPC ...... *G06F 17/5036* (2013.01); *G06F 3/04842* (2013.01); *G06F 17/505* (2013.01); *G06F 17/5031* (2013.01); *G06T 11/60* (2013.01)

(58) Field of Classification Search
CPC ............ G06F 3/04842; G06F 17/5031; G06F 17/505; G06F 17/5036
USPC .................................................. 716/103, 106
See application file for complete search history.

(56) References Cited

U.S. PATENT DOCUMENTS

| | | | | |
|---|---|---|---|---|
| 6,542,860 B1 * | 4/2003 | McBride | ............ | G06F 17/5022 703/14 |
| 6,721,922 B1 * | 4/2004 | Walters et al. | ..... | G06F 17/5022 716/102 |
| 7,231,335 B2 * | 6/2007 | Hayes et al. | ........ | G06F 17/5036 703/14 |
| 8,694,302 B1 * | 4/2014 | Ho | ...................... | G06F 17/5036 703/13 |
| 8,738,335 B1 * | 5/2014 | Ho | ...................... | G06F 17/5036 703/14 |
| 8,856,719 B2 * | 10/2014 | Min et al. | ........... | G06F 17/5036 716/133 |
| 9,342,647 B2 * | 5/2016 | Chen et al. | ......... | G06F 17/5081 |

OTHER PUBLICATIONS

"PSpice—Reference Guide", May 2000, Cadence Design System, Inc., technical report, one set.*
Rajagopalan, "A New Design Methodology for Mixed Level and Mix Signal Simulation using PSpice A/D and VHDL", Nov. 2005, Rochester Institute of Technology, Master Thesis, one set.*

* cited by examiner

*Primary Examiner* — Sun J Lin
(74) *Attorney, Agent, or Firm* — Mark H. Whittenberger, Esq.; Holland & Knight LLP

(57) ABSTRACT

Embodiments include herein are directed towards a method for generating an input/output model from a SPICE (Simulation Program with Integrated Circuit Emphasis) netlist. Embodiments may include receiving, using a processor, a SPICE netlist associated with an electronic design and selecting at least a portion of the SPICE netlist for analysis. Embodiments may further include reading the selected portion of the SPICE netlist and rendering a schematic symbol corresponding to the selected portion of the netlist. Embodiments may also include performing one or more operations associated with the schematic symbol and translating the one or more operations into simulation commands.

18 Claims, 28 Drawing Sheets

1600

1800

SYSTEM AND METHOD FOR SCHEMATIC-DRIVEN GENERATION OF INPUT/OUTPUT MODELS

BACKGROUND

An Input/Output Buffer Information Specification or "IBIS" is a specification of a method for integrated circuit vendors to provide information about the input/output buffers of their product to their prospective customers without revealing the intellectual property of their implementation and without requiring proprietary encryption keys. The specification may include two separate types of models, "traditional IBIS" and "IBIS-AMI." The traditional model is generated in text format and consists of a number of tables that captures current vs. voltage (IV) and voltage vs. time (Vt) characteristics of the buffer, as well as the values of certain parasitic components. It is a standard data exchange format for exchanging modeling information among semiconductor device suppliers, simulation software suppliers, and end users.

Traditional IBIS models are generally used instead of SPICE models to perform various board level signal integrity (SI) simulations and timing analyses. IBIS models could be used to verify signal integrity requirements, especially for high-speed products. These IBIS models are often generated using a SPICE netlist As discussed above, the IBIS model may capture the behavior of the IO-buffer as tabular data such as rise/fall waveforms (V/T data) and V/I curves. The tabular data is obtained by doing transient (V/T) and dc-sweep simulations (V/I) using standard stimulus. However, identifying the nodes for application of stimulus by reading textual netlists is painful. There are often a large number of simulations and trials required to ensure all of the dependencies for models are resolved. This involves huge amounts of manual preparation of Spice netlists for each simulation run.

Moreover, existing approaches require the use of templates that are difficult to understand as they use IBIS keywords that do not make much sense to a designer or model maker. The user needs to open the Spice netlists and go through sub-circuit nodes and mention the relevant nodes in templates. Multiple templates have to be created for each of the variants of the IO-model and each of the model-types. By way of example, a typical IO could have 30 strength variants, 3 speed variants each and 2 model-types, leading to 180 combinations.

SUMMARY

In one or more embodiments of the present disclosure, a computer-implemented method for generating an input/output model from a SPICE netlist is provided. The method may include receiving, using a processor, a SPICE netlist associated with an electronic design and select at least a portion of the SPICE netlist for analysis. The method may further include reading the selected portion of the SPICE netlist and rendering a schematic symbol corresponding to the selected portion of the netlist. The method may also include performing one or more operations associated with the schematic symbol and translating the one or more operations into simulation commands.

One or more of the following features may be included. The schematic symbol may include one or more pins, each of the one or more pins representing a node. The method may also include providing a display that allows for labeling of each of the one or more pins with a netlist parameter. Labeling may include at least one of input, output, power, ground, and enable labels. The method may further include providing a display that allows for assigning a voltage or termination to a floating node. The method may also include rendering one or more netlist parameters on the schematic. The method may also include allowing a user to specify a parameter value on the schematic. The method may include reviewing the SPICE netlist for at least one of a floating node, an unassigned parameter, and an unresolved model definition.

In one or more embodiments of the present disclosure a non-transitory computer-readable storage medium having stored thereon instructions for generating an input/output model from a SPICE netlist that when executed by a machine result in the following operations is provided. Operations may include receiving, using a processor, a SPICE netlist associated with an electronic design and allowing, at a graphical user interface, a user to select at least a portion of the SPICE netlist for analysis. Operations may further include reading the selected portion of the SPICE netlist and rendering, at the graphical user interface, a schematic symbol corresponding to the selected portion of the netlist. Operations may also include performing one or more operations associated with the schematic symbol and translating the one or more operations into simulation commands.

One or more of the following features may be included. The schematic symbol may include one or more pins, each of the one or more pins representing a node. Operations may also include providing, at the graphical user interface, a display that allows for labeling of each of the one or more pins with a netlist parameter. Labeling may include at least one of input, output, power, ground, and enable labels. Operations may further include providing, at the graphical user interface, a display that allows for assigning a voltage or termination to a floating node. Operations may also include rendering one or more netlist parameters on the schematic. Operations may also include allowing a user to specify a parameter value on the schematic. Operations may include reviewing the SPICE netlist for at least one of a floating node, an unassigned parameter, and an unresolved model definition.

In one or more embodiments of the present disclosure, a system for generating an input/output model from a SPICE netlist is provided. The system may include a computing device having at least one processor configured to receive, using a processor, a SPICE netlist associated with an electronic design. The at least one processor may be further configured to allow, at a graphical user interface, a user to select at least a portion of the SPICE netlist for analysis. The at least one processor may be further configured to read the selected portion of the SPICE netlist and render, at the graphical user interface, a schematic symbol corresponding to the selected portion of the netlist. The at least one processor may be further configured to perform one or more operations associated with the schematic symbol and to translate the one or more operations into simulation commands.

One or more of the following features may be included. In some embodiments, the schematic symbol may include one or more pins, each of the one or more pins representing a node. The at least one processor may be further configured to provide, at the graphical user interface, a display that allows for labeling of each of the one or more pins with a netlist parameter. The at least one processor may be further configured to render one or more netlist parameters on the schematic and allowing a user to specify a parameter value on the schematic.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
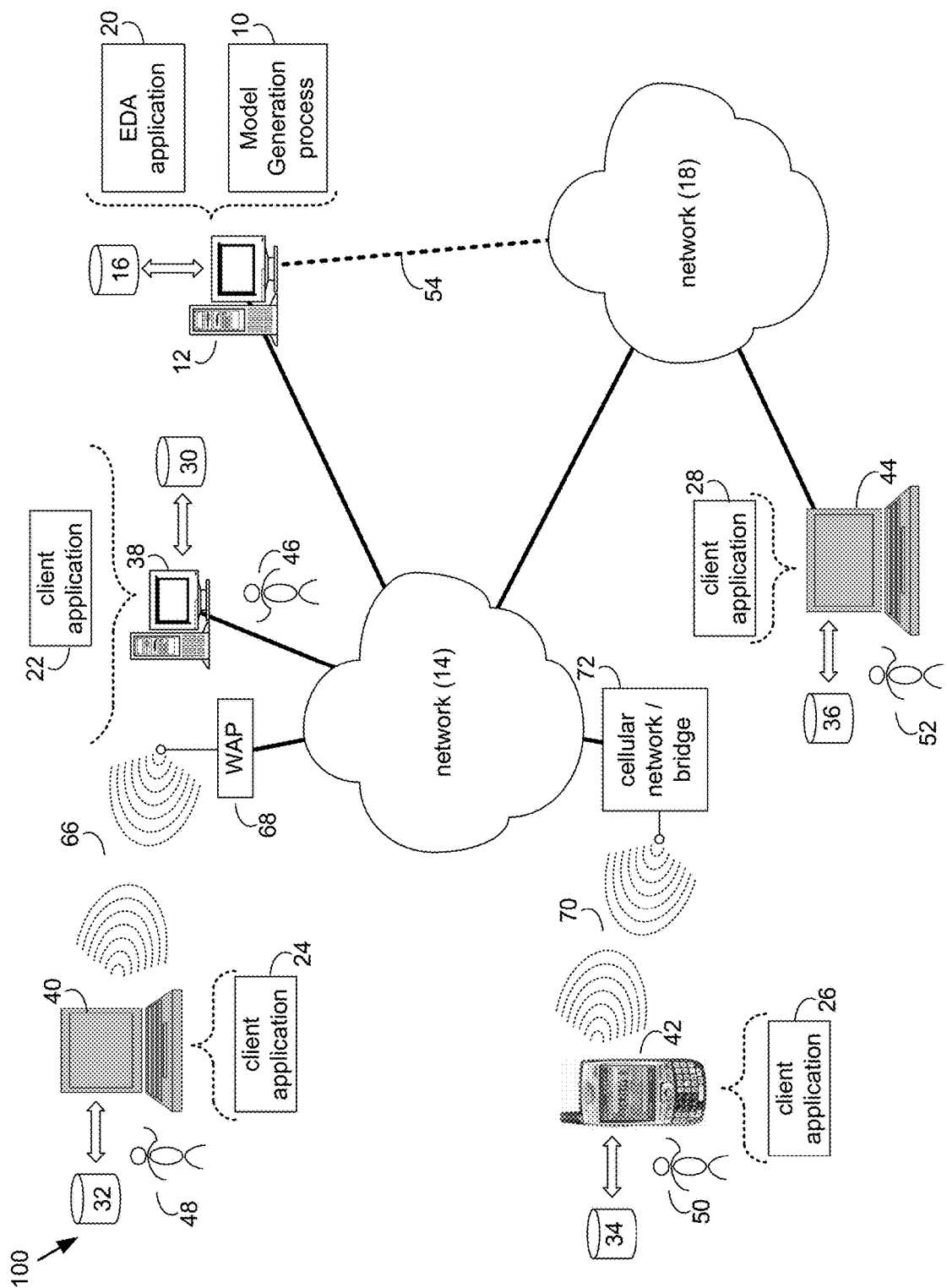
FIG. 1 is a diagram depicting an embodiment of a system in accordance with the present disclosure.

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

As used in any embodiment described herein, "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

One or more hardware description languages may be used in accordance with the present disclosure. Some hardware description languages may include, but are not limited to, Verilog, VHDL, SystemC, SystemVerilog and Verilog-AMS. Various other hardware description languages may also be used as well.

Referring to FIG. 1, there is shown a model generation process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, model generation process 10 may reside on and be executed, in whole or in part, by a client electronic device, such as a personal computer, notebook computer, personal digital assistant, or the like.

The instruction sets and subroutines of model generation process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language (HDL) files, which may contain the port type descriptions and executable specifications of hardware blocks.

Server computer 12 may execute a web server application, examples of which may include but are not limited to: Microsoft IIS, Novell Webserver™, or Apache® Webserver, that allows for HTTP (e.g., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute an electronic design automation (EDA) application (e.g., EDA application 20), examples of which may include, but are not limited to those available from the assignee of the present application. EDA application 20 may interact with one or more EDA client applications (e.g., EDA client applications 22, 24, 26, 28) for electronic design optimization.

Model generation process 10 may be a stand alone application, or may be an applet/application/script that may interact with and/or be executed within EDA application 20. In addition/as an alternative to being a server-side process, model generation process 10 may be a client-side process (not shown) that may reside on a client electronic device (described below) and may interact with an EDA client application (e.g., one or more of EDA client applications 22, 24, 26, 28). Further, model generation process 10 may be a hybrid server-side/client-side process that may interact with EDA application 20 and an EDA client application (e.g., one or more of client applications 22, 24, 26, 28). As such, model generation process 10 may reside, in whole, or in part, on server computer 12 and/or one or more client electronic devices.

The instruction sets and subroutines of EDA application 20, which may be stored on storage device 16 coupled to server computer 12 may be executed by one or more processors (not shown) and one or more memory modules (not shown) incorporated into server computer 12.

The instruction sets and subroutines of EDA client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access EDA application 20 and may allow users to e.g., utilize model generation process 10.

Users 46, 48, 50, 52 may access EDA application 20 directly through the device on which the client application (e.g., client applications 22, 24, 26, 28) is executed, namely client electronic devices 38, 40, 42, 44, for example. Users 46, 48, 50, 52 may access EDA application 20 directly through network 14 or through secondary network 18. Further, server computer 12 (e.g., the computer that executes EDA application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (e.g., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (e.g., CSMA/CA) for path sharing. The various 802.11x specifications may use phase-shift keying (e.g., PSK) modulation or complementary code keying (e.g., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both).

Figure 2:
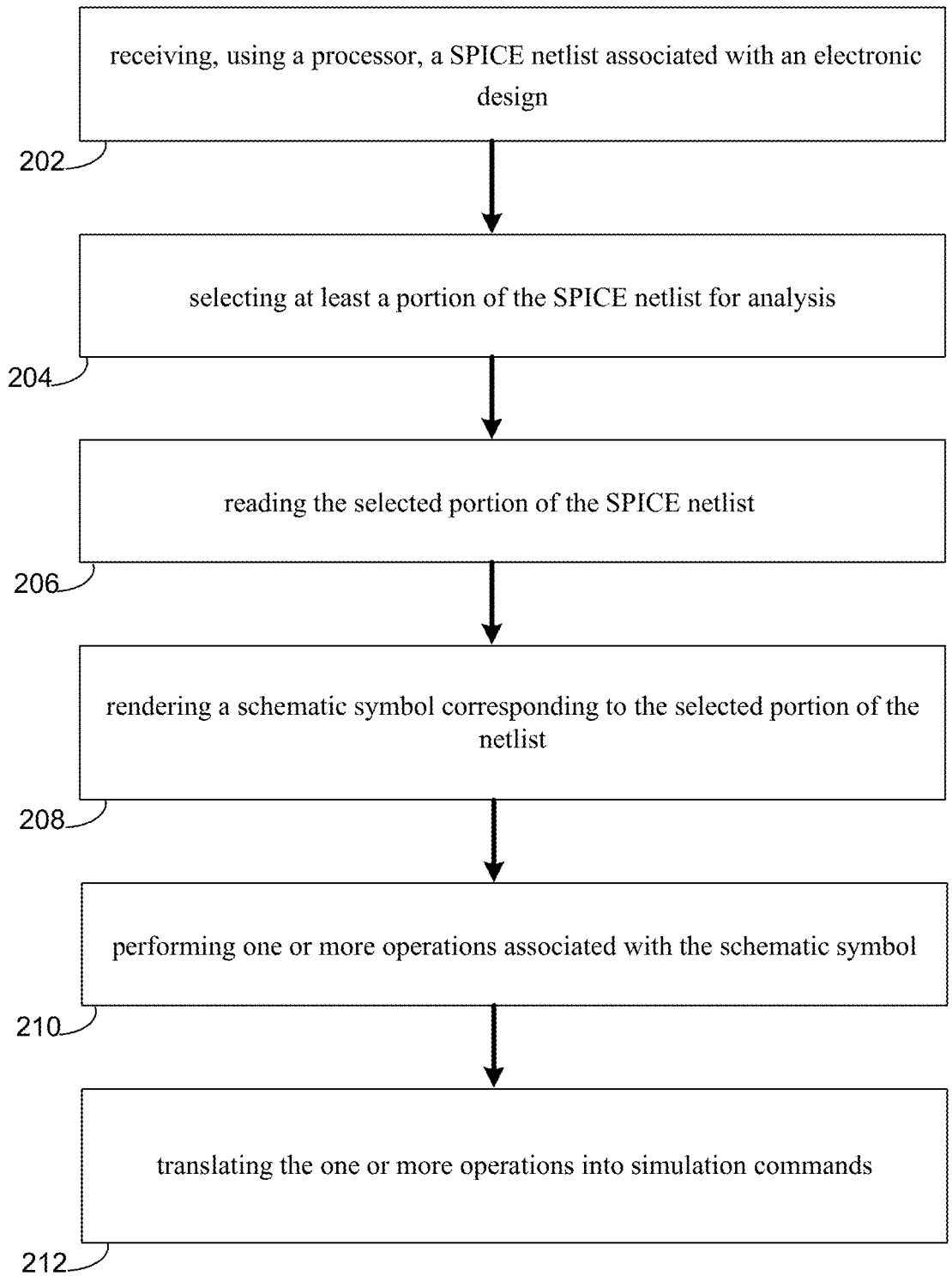
FIG. 2 is a flowchart depicting operations consistent with the model generation process in accordance with an embodiment of the present disclosure.

Referring now to FIG. 2, an exemplary flowchart 200 depicting operations consistent with model generation process 10 is provided. Operations may include receiving (202), using a processor, a SPICE netlist associated with an electronic design and selecting (204) at least a portion of the SPICE netlist for analysis. Embodiments may further include reading (206) the selected portion of the SPICE netlist and rendering (208) a schematic symbol corresponding to the selected portion of the netlist. Embodiments may also include performing (210) one or more operations associated with the schematic symbol and translating (212) the one or more operations into simulation commands.

In some embodiments, model generation process 10 may be configured to render a netlist, or subportion (e.g. subckt) of a netlist as a schematic symbol to assist pin and parameter assignments per model-variant. Model generation process 10 may further include automatic checks for floating-nodes, unresolved model-definitions, illegal parameter assignments, etc. Embodiments may also include automatic generation of model-variants for a given SPICE netlist. This saves a huge amount of time and allows for efficient model-management as well. Model generation process 10 may be incorporated into part of an EDA application, such as EDA application 20 shown in FIG. 2.

In some embodiments, generating an IO model from a spice netlist requires identifying nodes for application of stimulus. In existing systems, this is done by reading textual netlists and is a painful task. Simulations and trials must be performed to ensure all dependencies for models are resolved. This requires numerous settings and manual preparation of Spice netlists for each model variant. A typical IO spice netlist leads to 100+ model variants depending on corner-settings, parameter-variations (e.g., slew, driver strength, etc.) and IO-types (e.g., Input, Output, IO, etc.). This implies huge manual effort per model variant. Existing tools may provide all settings as text files and requires manual preparation of netlists (all above mentioned issues show up here).

Figure 3:
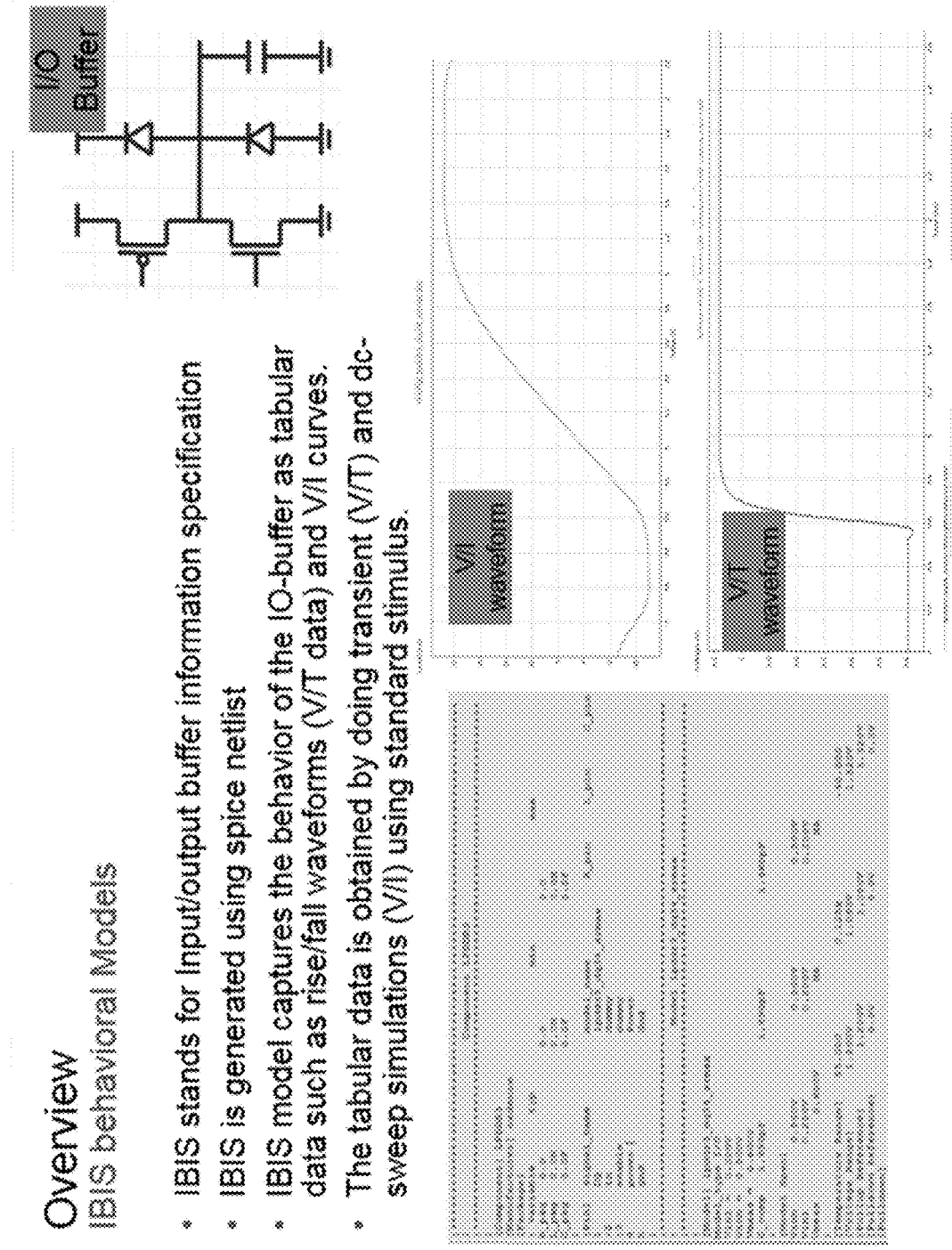
FIG. 3 is a diagram depicting an embodiment in accordance with the present disclosure.
Figure 4:
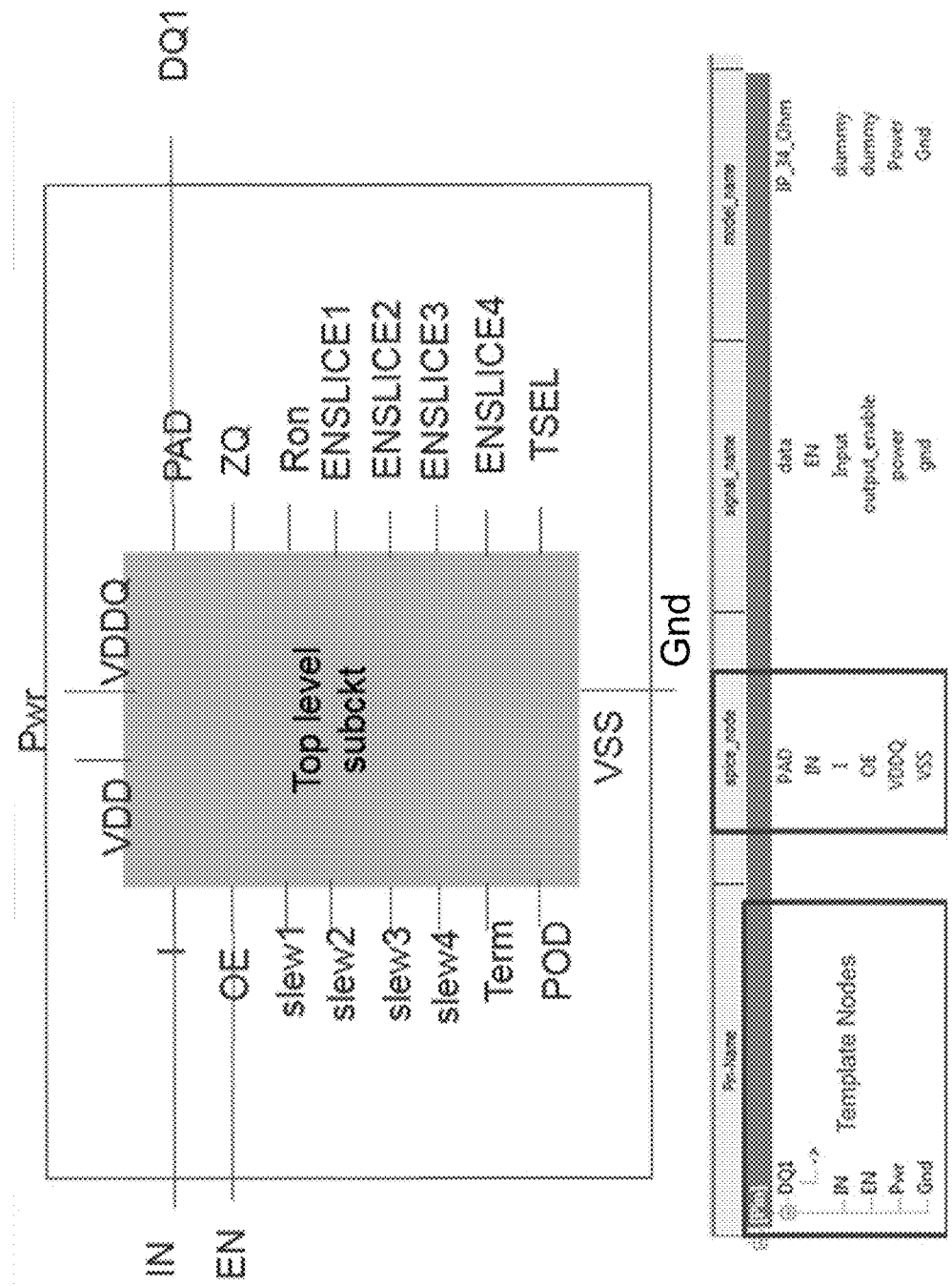
FIG. 4 is a diagram depicting an embodiment in accordance with the present disclosure.
Figure 5:
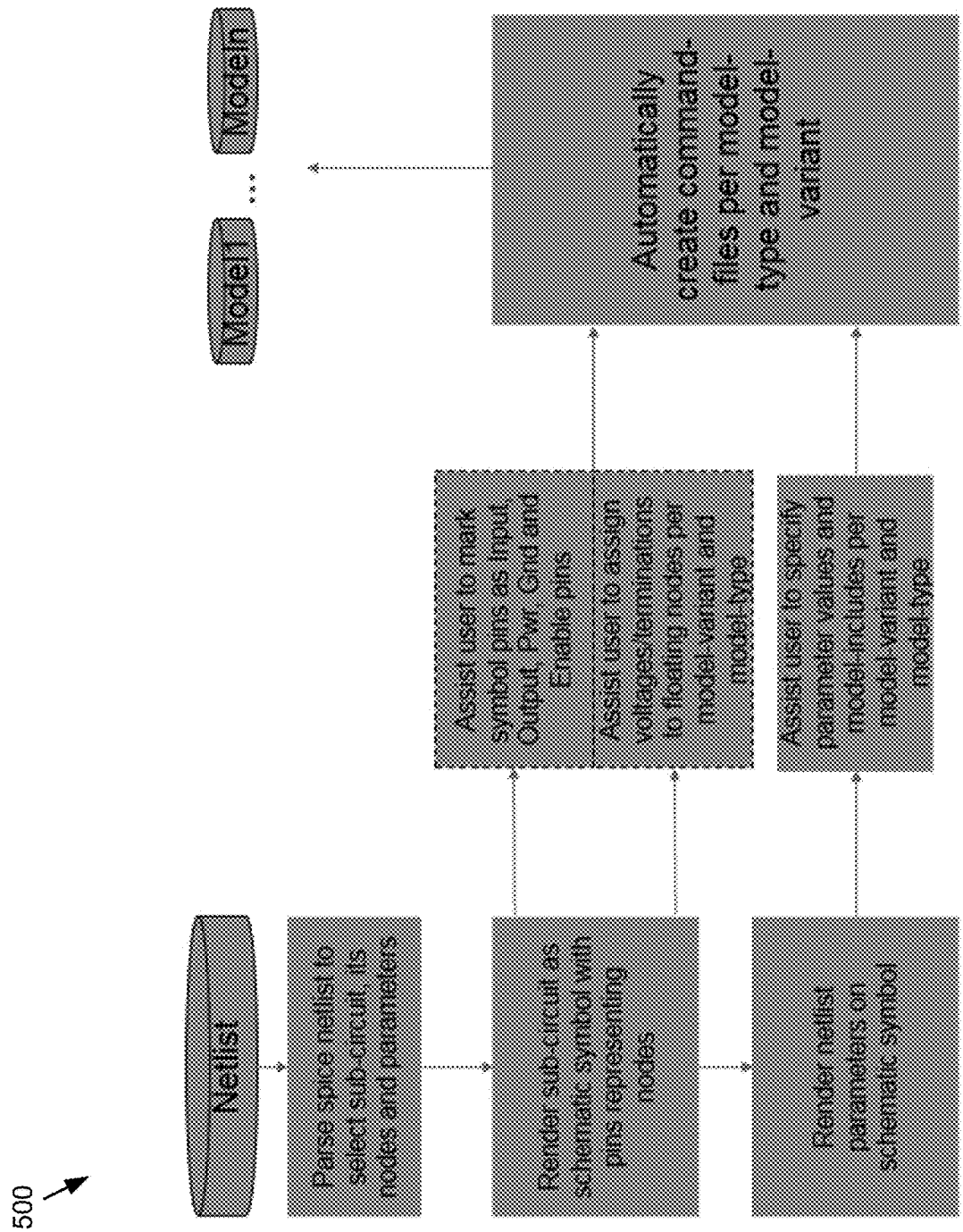
FIG. 5 is a diagram depicting an embodiment in accordance with the present disclosure.
Figure 6:
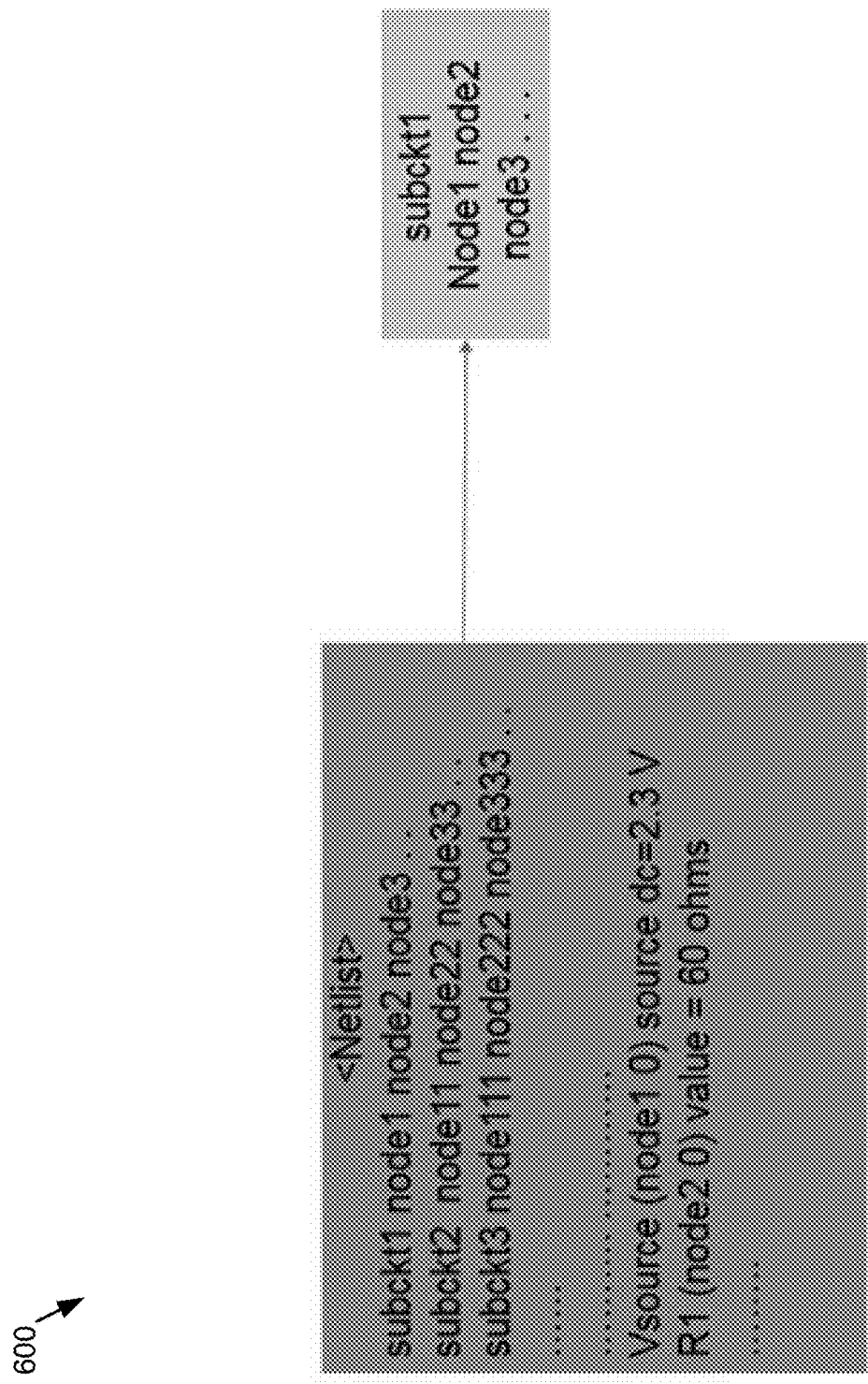
FIG. 6 is a diagram depicting an embodiment in accordance with the present disclosure.
Figure 7:
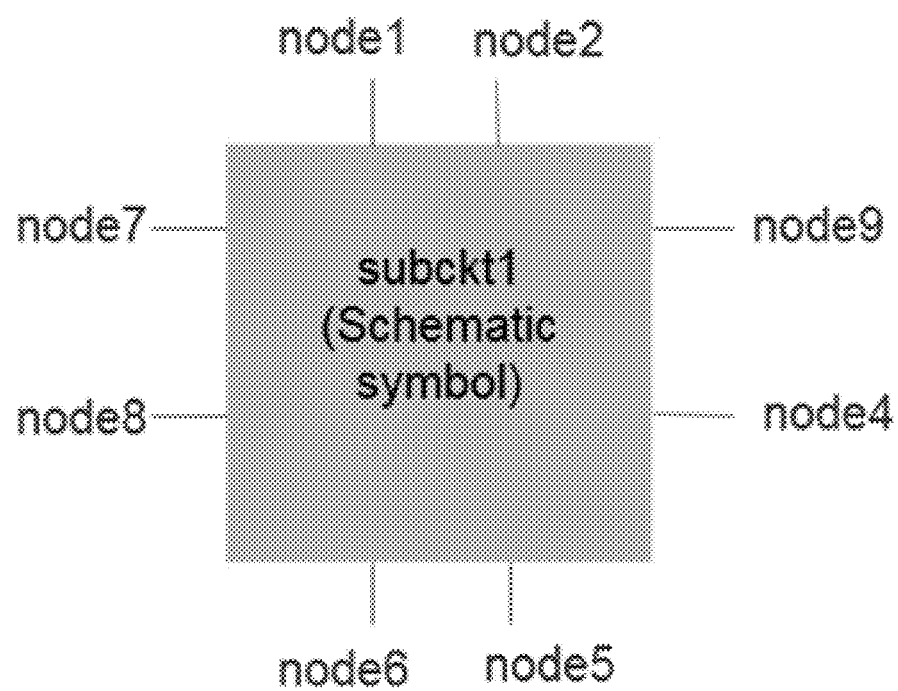
FIG. 7 is a diagram depicting an embodiment in accordance with the present disclosure.
Figure 8:
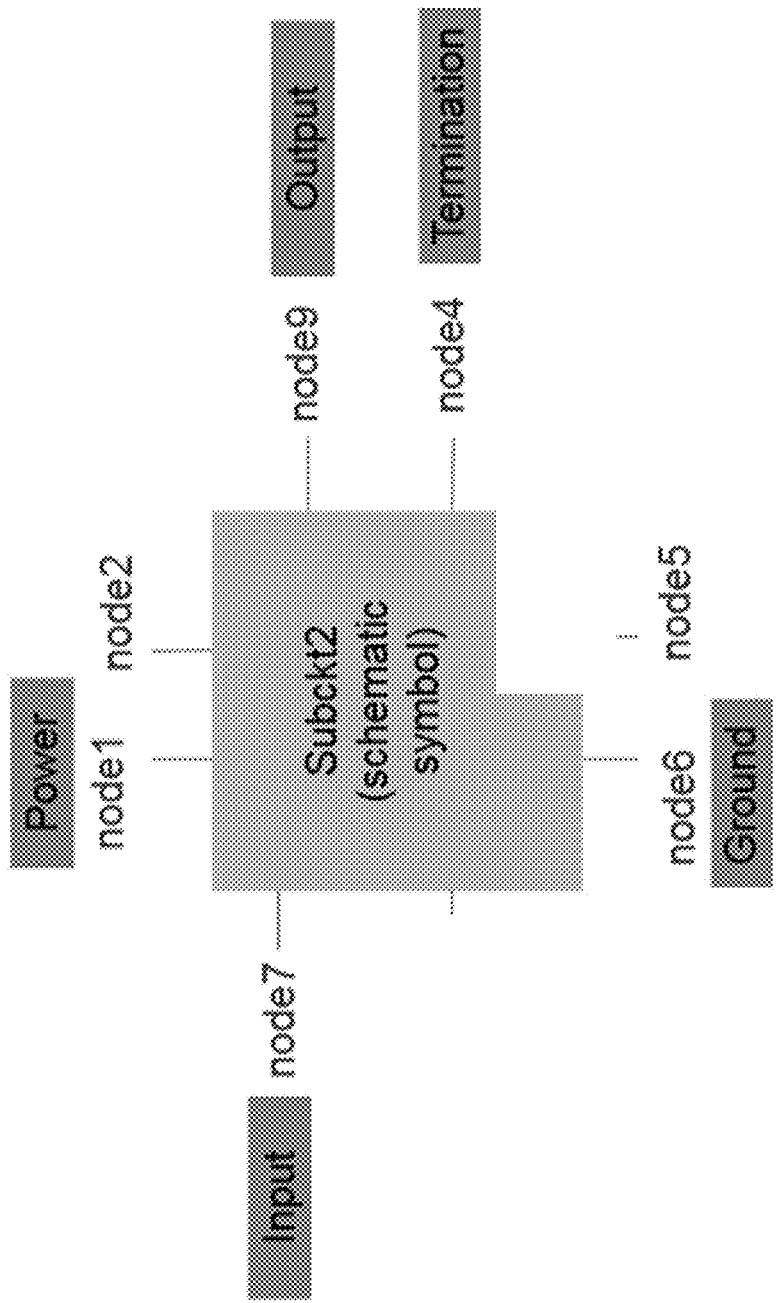
FIG. 8 is a diagram depicting an embodiment in accordance with the present disclosure.

Referring also to FIG. 3, a diagram depicting an overview of IBIS behavioral models including example V/I and V/T waveforms are provided. A number of operations may be included in the generation of IBIS models. These operations may be performed for both speed and strength-variants (e.g., 40Ω, 48Ω, 60Ω) which may correspond with how much current a driver may insert into the system, for each of the IO-types (e.g., Output model, Input model, Series model, etc.), for each of the I/V tables and V/T tables, and for each of corners (e.g., typical conditions, minimum conditions, max conditions, etc.). Some operations may include setting up a SPICE netlist, which may include, but is not limited to, identifying nodes in the IO-buffer sub-circuit for applying a stimulus and to declare nodes of observation, including/ proper device-models, giving proper bias voltages at relevant nodes, setting up corner parameters, setting up speed-variant parameters, applying stimulus at relevant circuit nodes, etc. After the SPICE netlist is set up, the process may also involve running simulations, and collating data and putting it into an IBIS model format. As such, in these prior systems, generating multiple IBIS models requires multiple setups and changes in the netlist. FIG. 4 shows an example of the manual mapping of sub-circuit nodes in a project template. In this example, commands are needed for the IBIS/SPICE handshake and each of the pins need a value.

Figure 9:
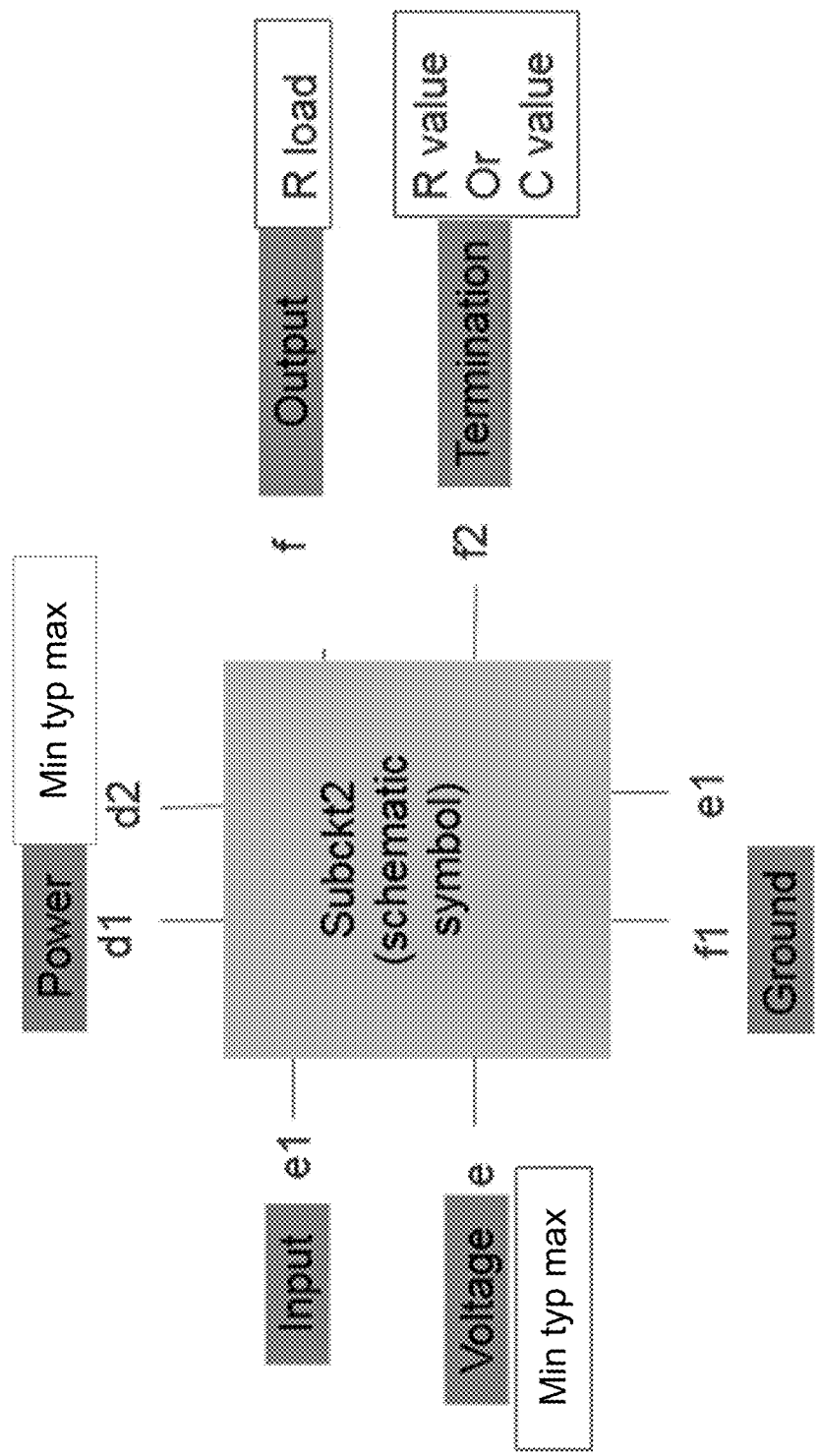
FIG. 9 is a diagram depicting an embodiment in accordance with the present disclosure.

Accordingly, and referring now to FIGS. 5-8, embodiments of model generation process 10 may allow for the automatic creation of multiple model-variants from a single setting. Embodiments may include parsing the SPICE netlist to select a sub-circuit, its nodes and parameters (see FIG. 6). For example, out of the many subcircuits present in the netlist a selection may be made for which IBIS model has to be made. Embodiments may include rendering a sub-circuit as a schematic symbol with pins representing nodes (see FIG. 7). In this way, model generation process 10 may be configured to assist the user to mark symbol pins as Input, Output, Pwr, Gnd and Enable pins (see FIG. 7). Model generation process 10 may further assist the user to assign voltages/terminations to floating nodes per model-variant and model-type. Embodiments may also include rendering netlist parameters on the schematic symbol (see FIG. 8). Model generation process 10 may be further configured to assist the user to specify parameter values and model-includes per model-variant and model-type (see FIG. 9). A command line file may be automatically created and a model may be generated.

Accordingly, embodiments of model generation process 10 may provide a netlist that may be available as a schematic symbol that allows easy comprehension and assignment of pin-values. There is no need to deal with any SPICE syntax. Embodiments of model generation process 10 may also be configured to provide automatic checking as part of the setup as opposed to fixing issues after simulations are run. These checks may include, but are not limited to, check for floating-nodes, check for unassigned parameters, check for unresolved model definitions, etc.

Embodiments of model generation process 10 may allow for a single setup required to generate all model-variants, which results in a huge time reduction for the designer. For example, a typical IO-buffer might have hundreds of variants based on strengths, slew-rates, and model-types.

Figure 10:
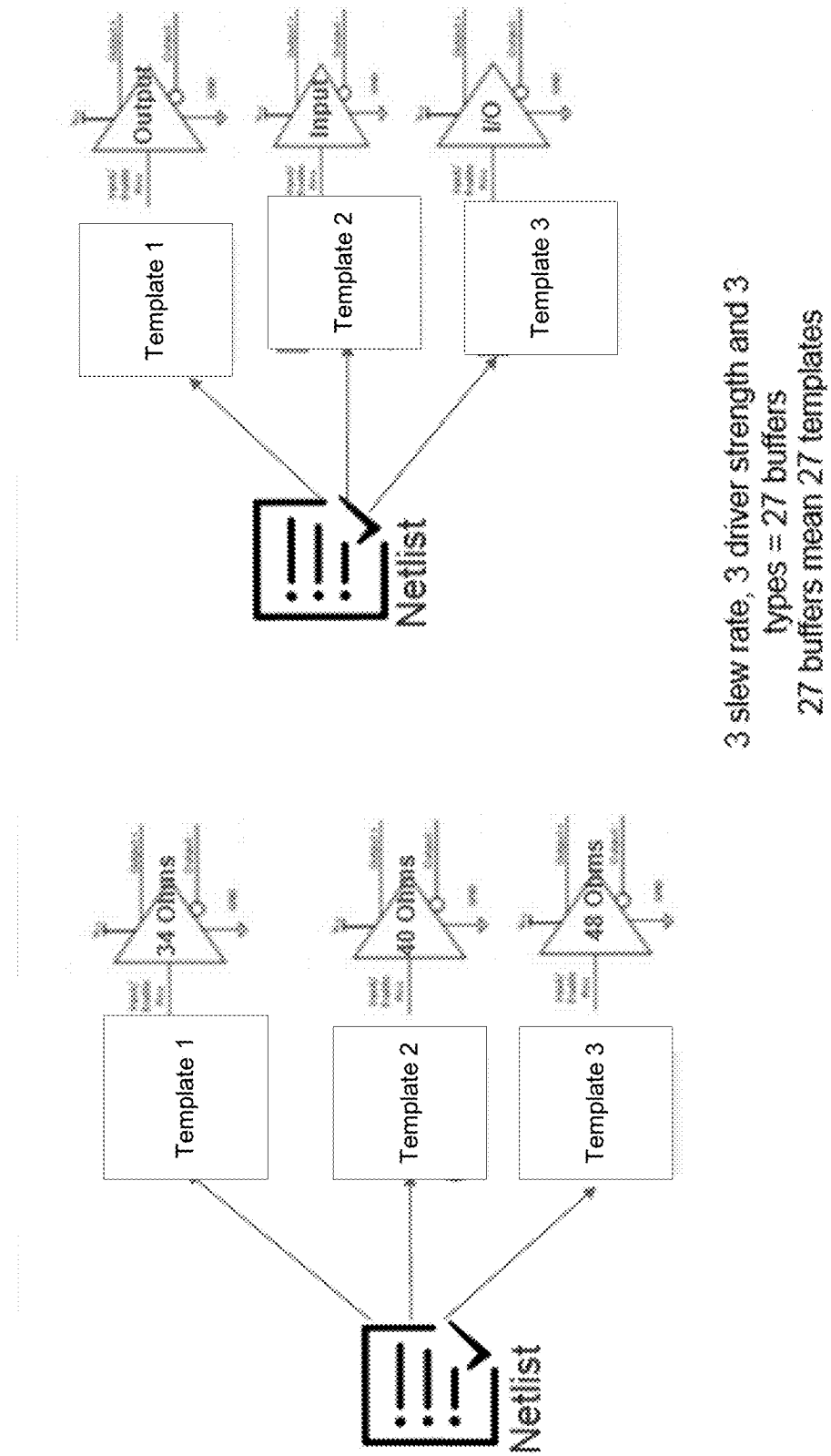
FIG. 10 is a diagram depicting an embodiment in accordance with the present disclosure.
Figure 11:
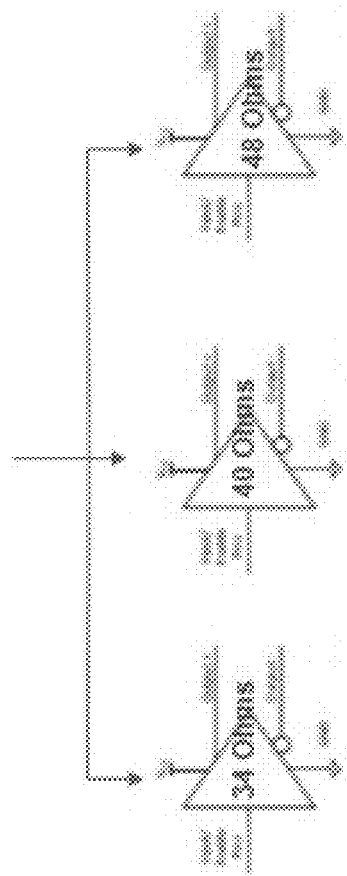
FIG. 11 is a diagram depicting an embodiment in accordance with the present disclosure.

Referring now to FIGS. 10-11, a comparison between the traditional approach and the embodiments of model generation process 10 is provided. FIG. 10 shows a traditional approach with 27 command files. In contrast, FIG. 11 shows a schematic based approach consistent with the teachings of the present disclosure. FIG. 11 depicts a single schematic setting for multiple model generation. This technique saves time by a factor of "X" where X is the number of models to be generated.

Figure 12:
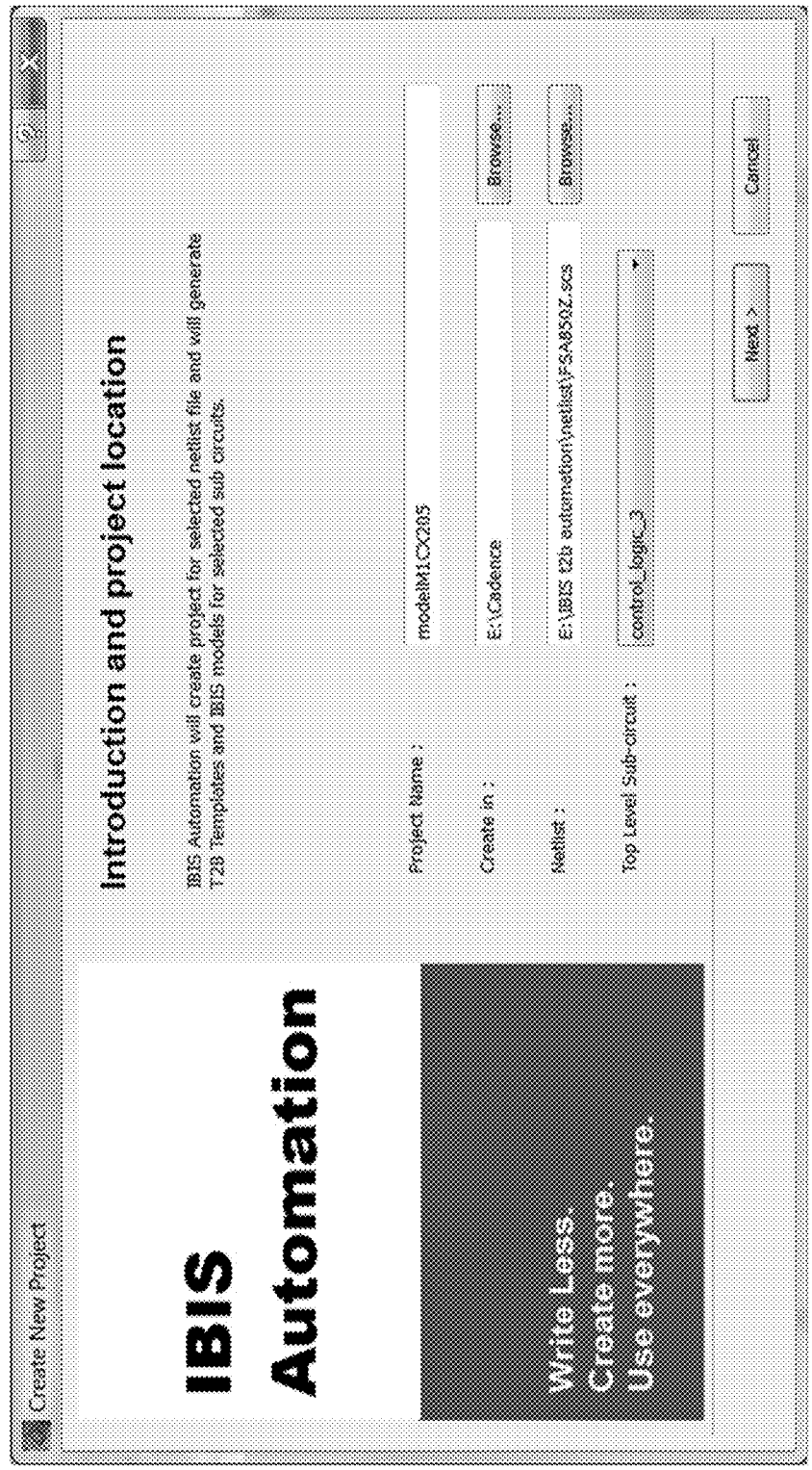
FIG. 12 is a diagram depicting a graphical user interface in accordance with the present disclosure.
Figure 13:
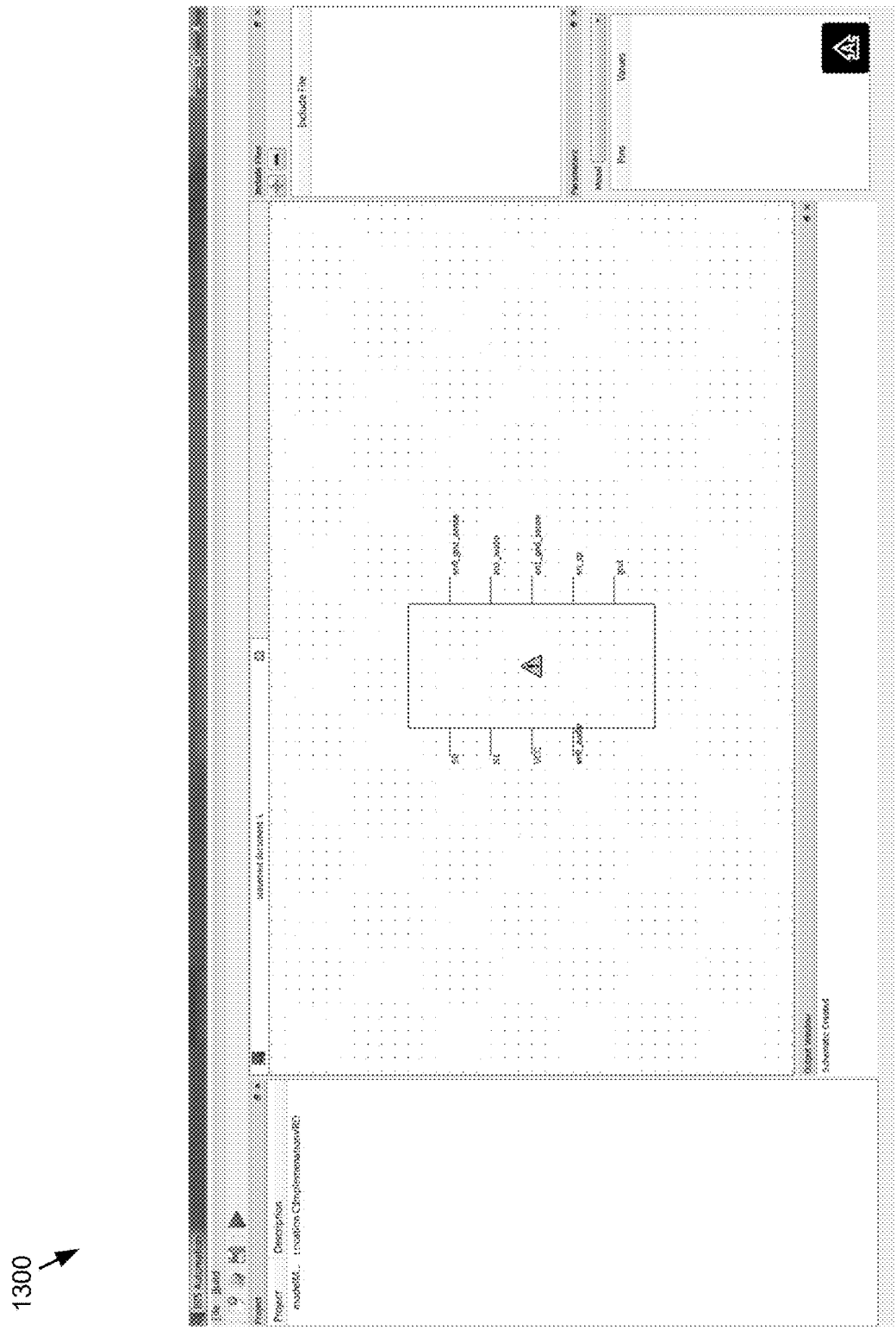
FIG. 13 is a diagram depicting a graphical user interface in accordance with the present disclosure.

Referring now to FIGS. 12-27, various graphical user interfaces are shown that may be used in accordance with model generation process 10. FIG. 12 shows a GUI 1200 wherein model generation process 10 may read a portion of the netlist and allow for the selection of one or more subcircuits. FIG. 13 shows a GUI 1300 depicting a rendered schematic that may be displayed upon reading the netlist.

Figure 14:
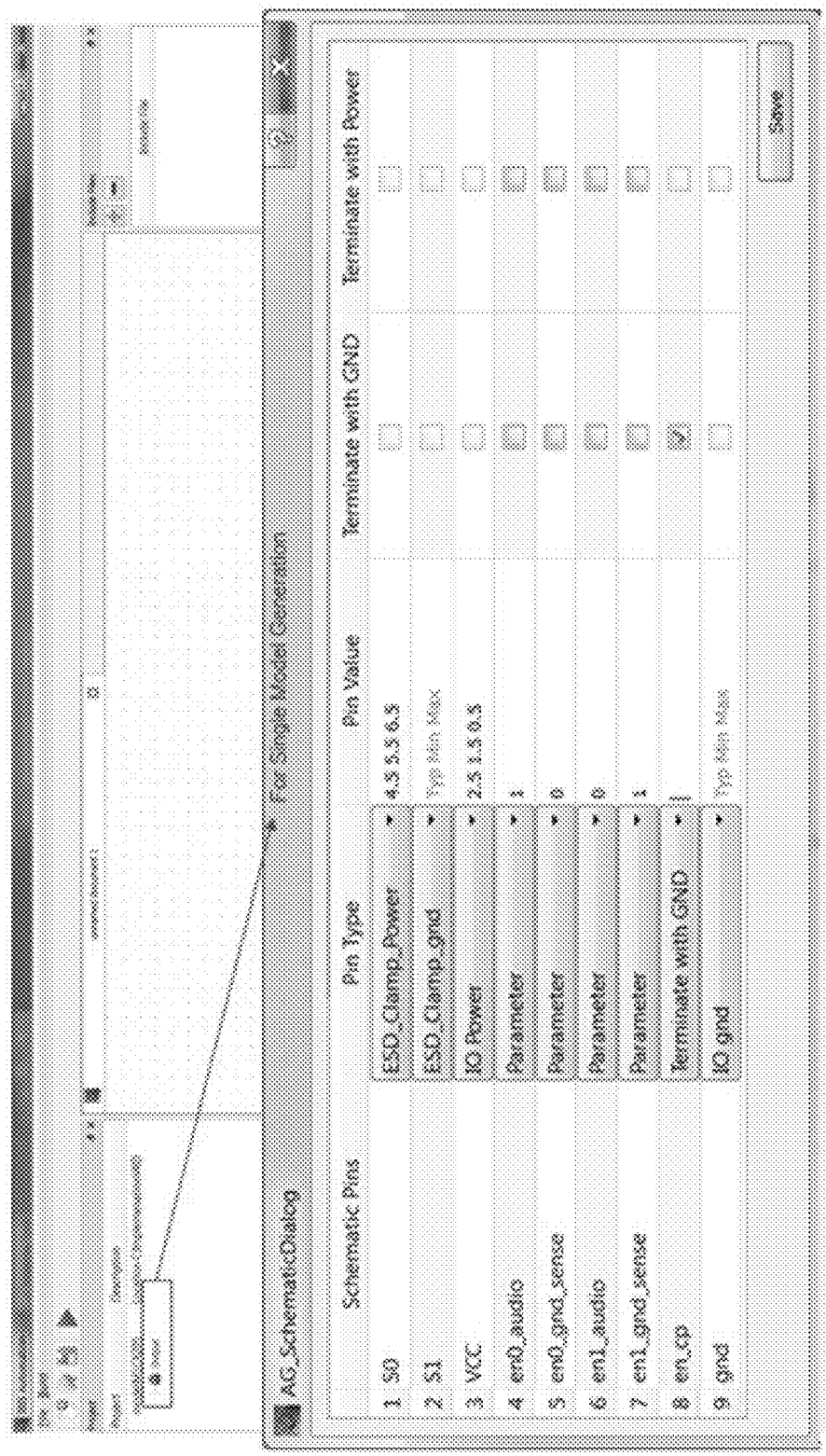
FIG. 14 is a diagram depicting a graphical user interface in accordance with the present disclosure.
Figure 15:
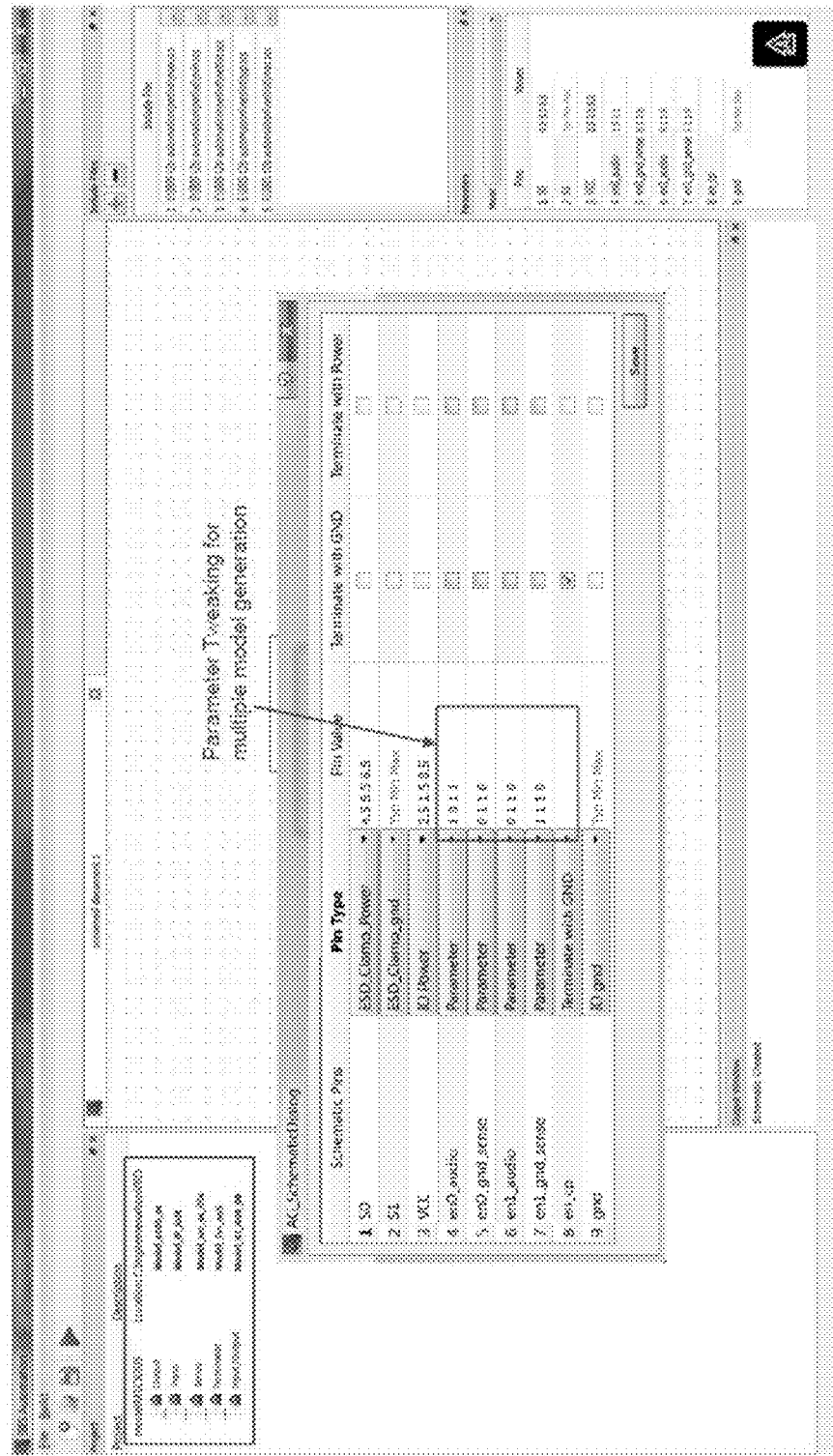
FIG. 15 is a diagram depicting a graphical user interface in accordance with the present disclosure.
Figure 16:
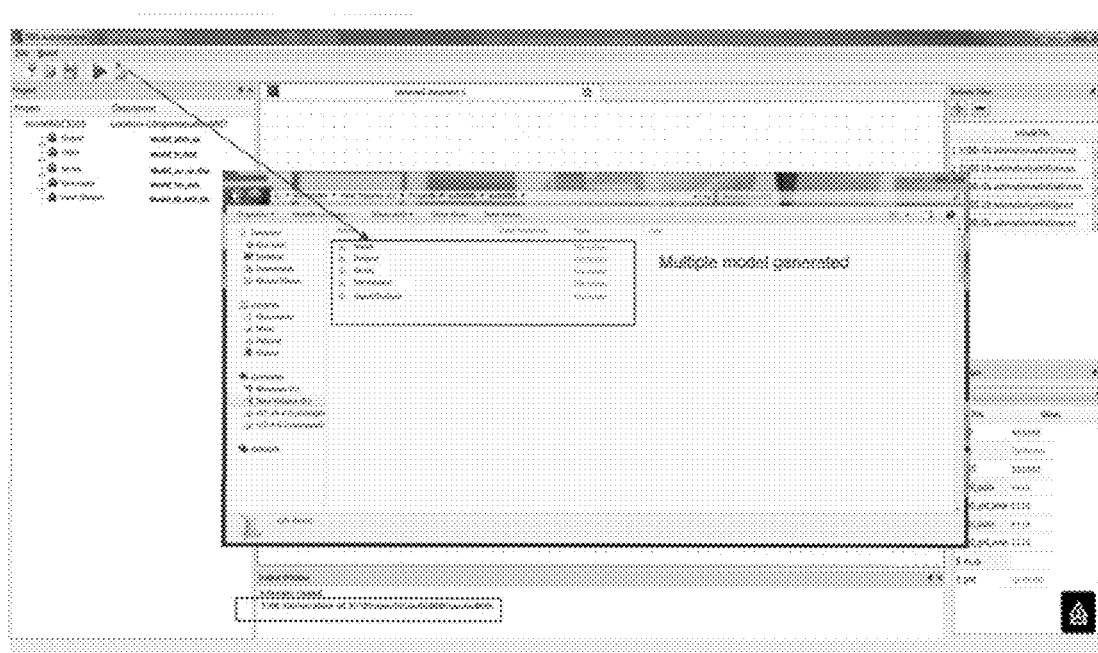
FIG. 16 is a diagram depicting a graphical user interface in accordance with the present disclosure.

Referring now to FIGS. 14-16, examples of model generation process 10 allowing for both single and multiple model generation are provided. FIG. 14 shows a GUI 1400 depicting an example of a schematic setting for single model generation. In this particular example, GUI 1400 provides a listing of the schematic pins, drop down menus corresponding to the pin type, user editable pin values, ground and power termination, etc. FIG. 15 shows a GUI 1500 depicting an example of a schematic setting for multiple model generation is provided. In this example, the system may allow the user to alter one or more parameters for the generation of multiple models. FIG. 16 shows a GUI 1600 where multiple models have been generated. Examples of the specific operation of model generation process 10 with respect to some of these GUIs are provided in further detail hereinbelow.

Figure 17:
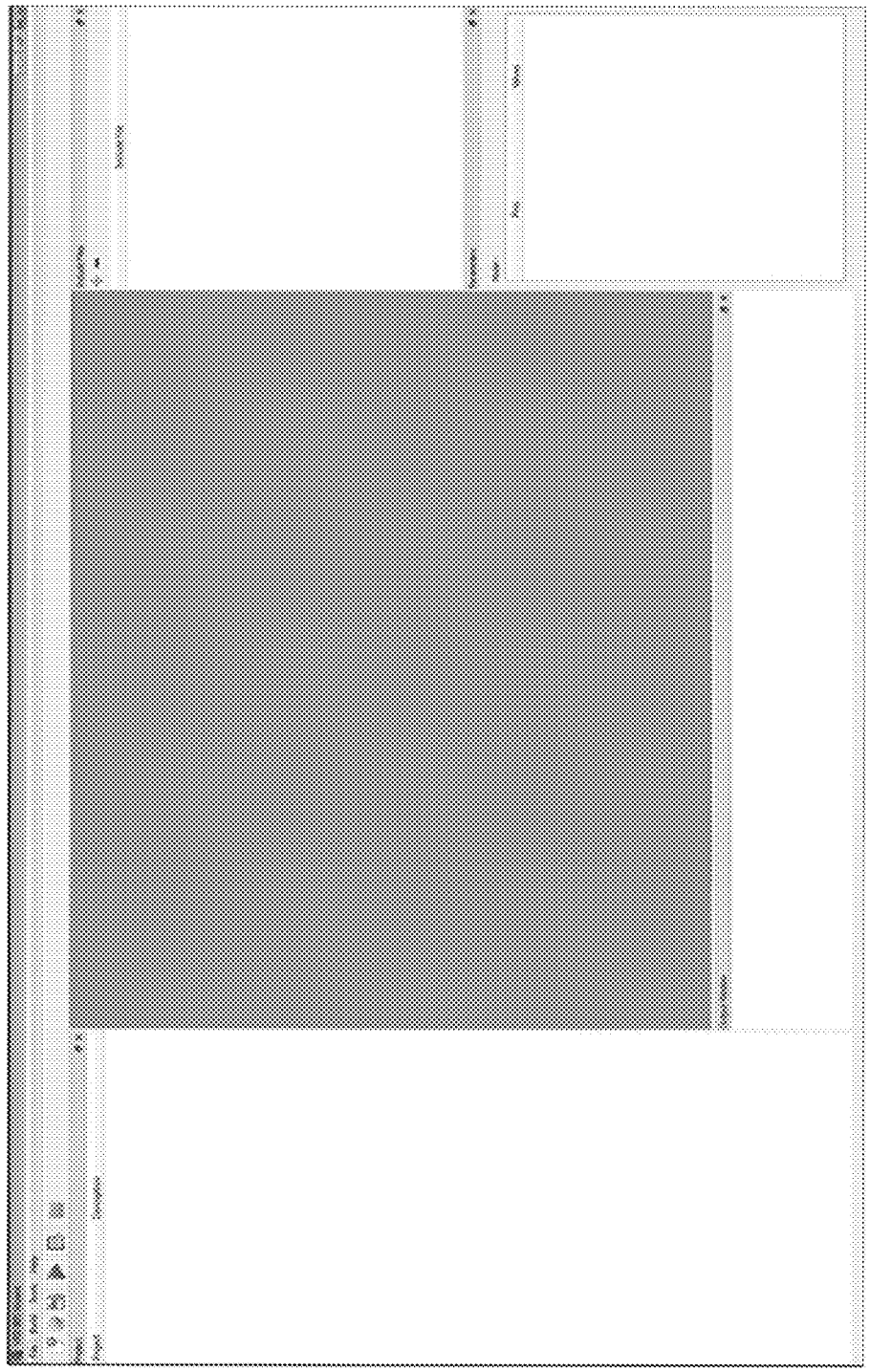
FIG. 17 is a diagram depicting a graphical user interface in accordance with the present disclosure.
Figure 18:
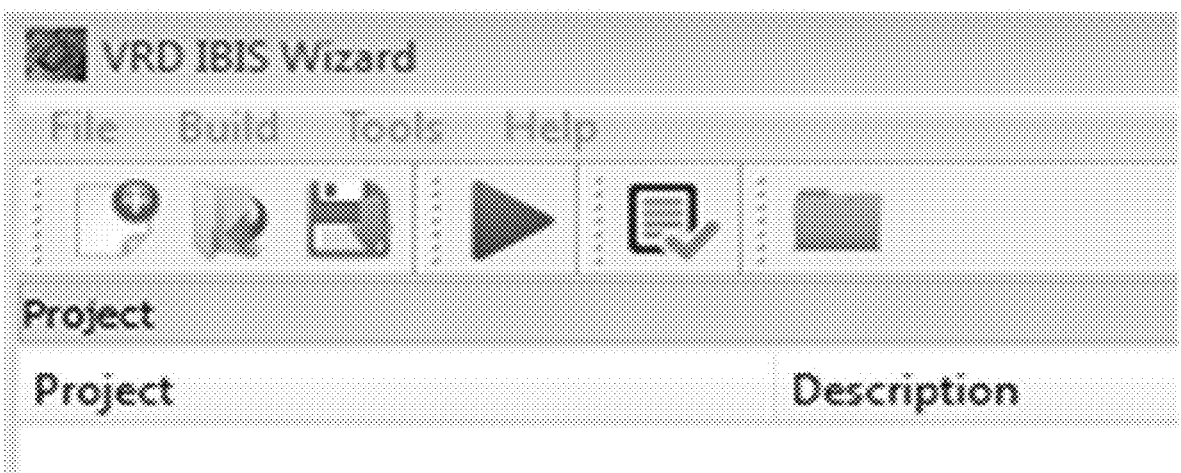
FIG. 18 is a diagram depicting a graphical user interface in accordance with the present disclosure.
Figure 19:
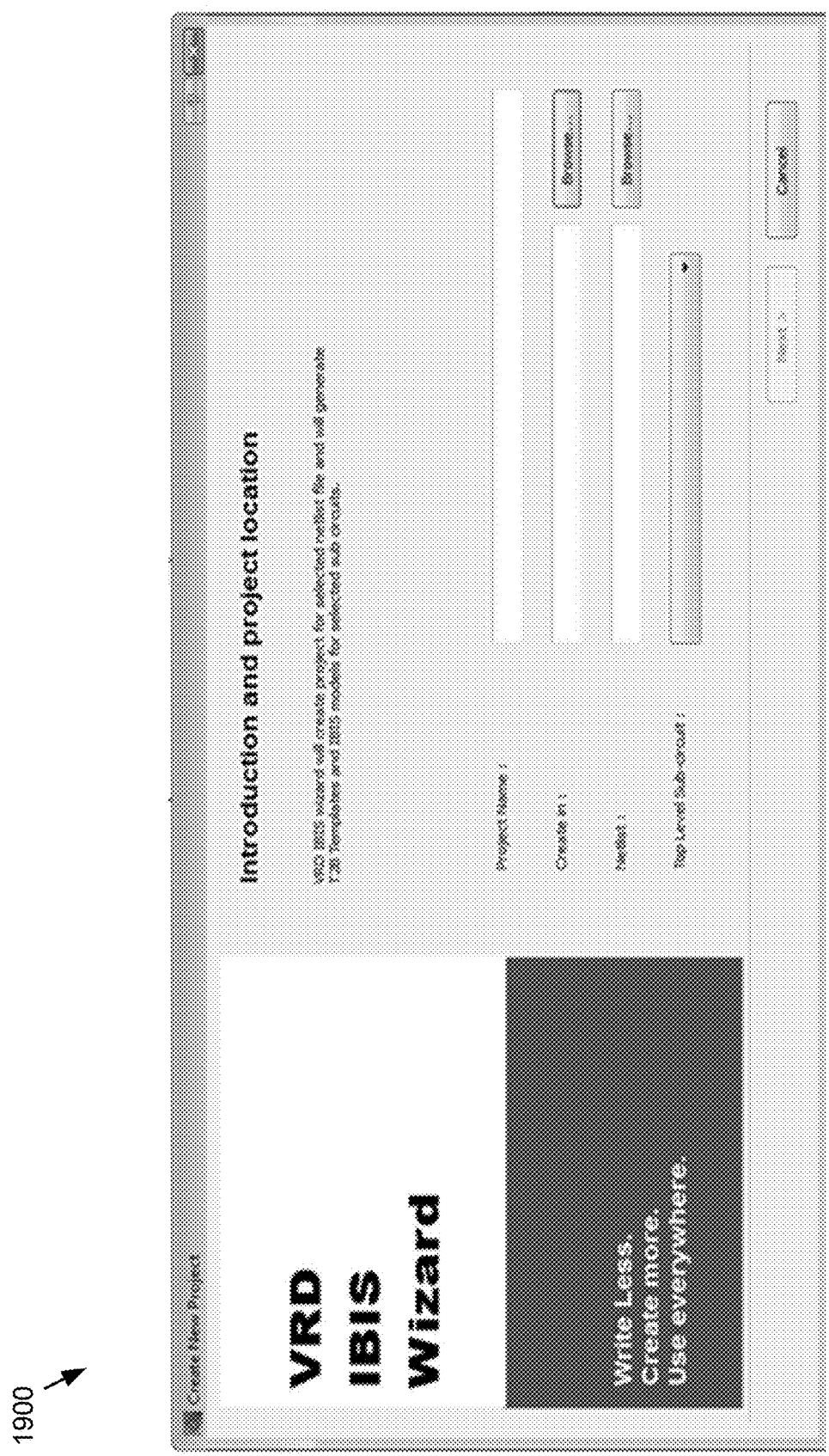
FIG. 19 is a diagram depicting a graphical user interface in accordance with the present disclosure.
Figure 20:
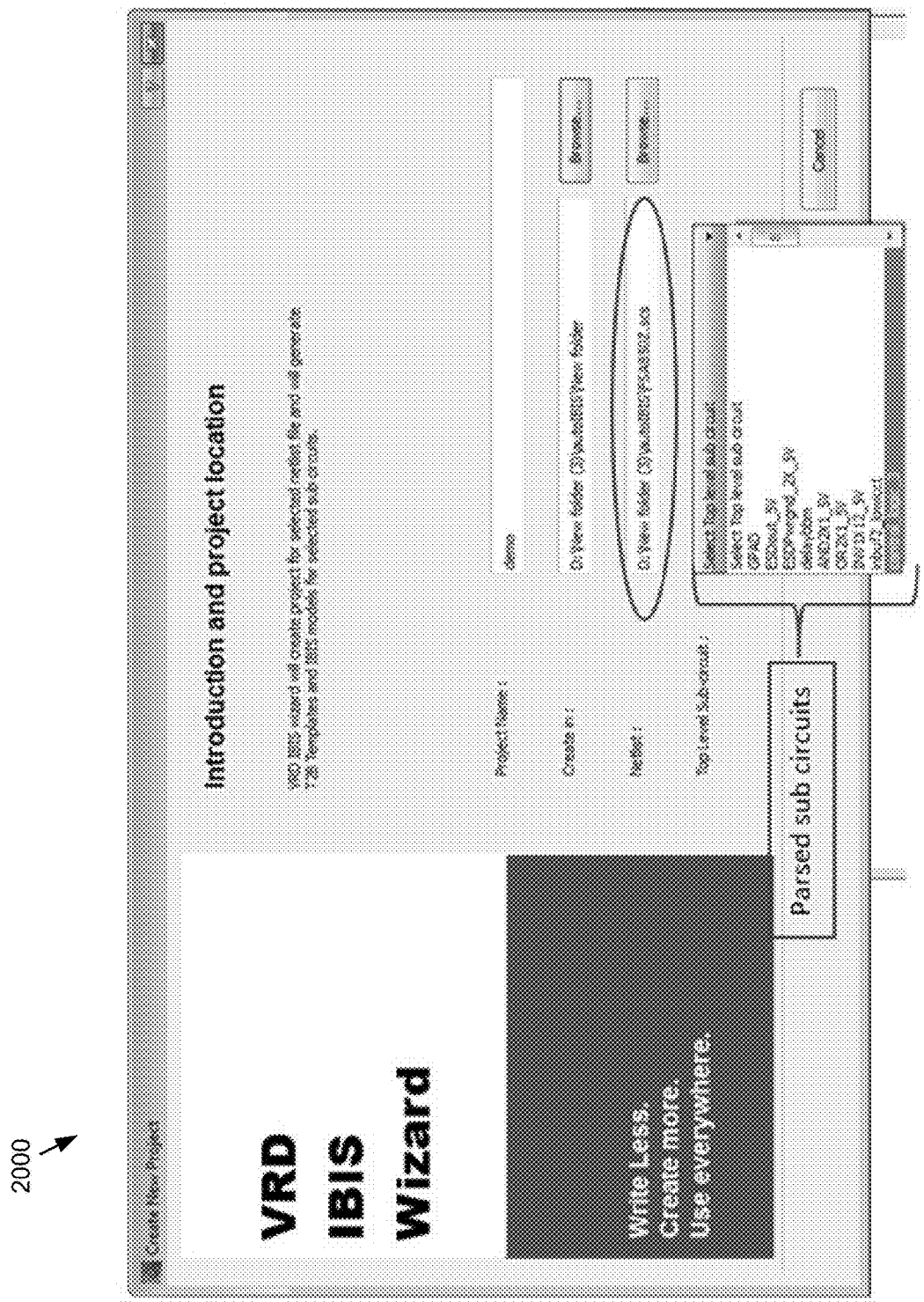
FIG. 20 is a diagram depicting a graphical user interface in accordance with the present disclosure.

Referring now to FIGS. 17-28, further examples consistent with embodiments of model generation process 10 are provided. FIG. 17 shows an example of an initial blank canvas that may correspond to a home screen of model generation process 10. FIG. 18 shows an example GUI 1800 that may be used to create a new project. FIG. 19 shows an example GUI 1900 that may allow the user to enter various types of information, including, but not limited to, project name, location of the project, SPICE netlist, etc. FIG. 20 shows an example GUI 2000 that allows for the browsing and loading of the SPICE netlist. In operation, the parser may be configured to populate some or all of the subckts present in the SPICE netlist. The user may be provided with the option of selecting the subckt for which IBIS has to be generated.

Figure 21:
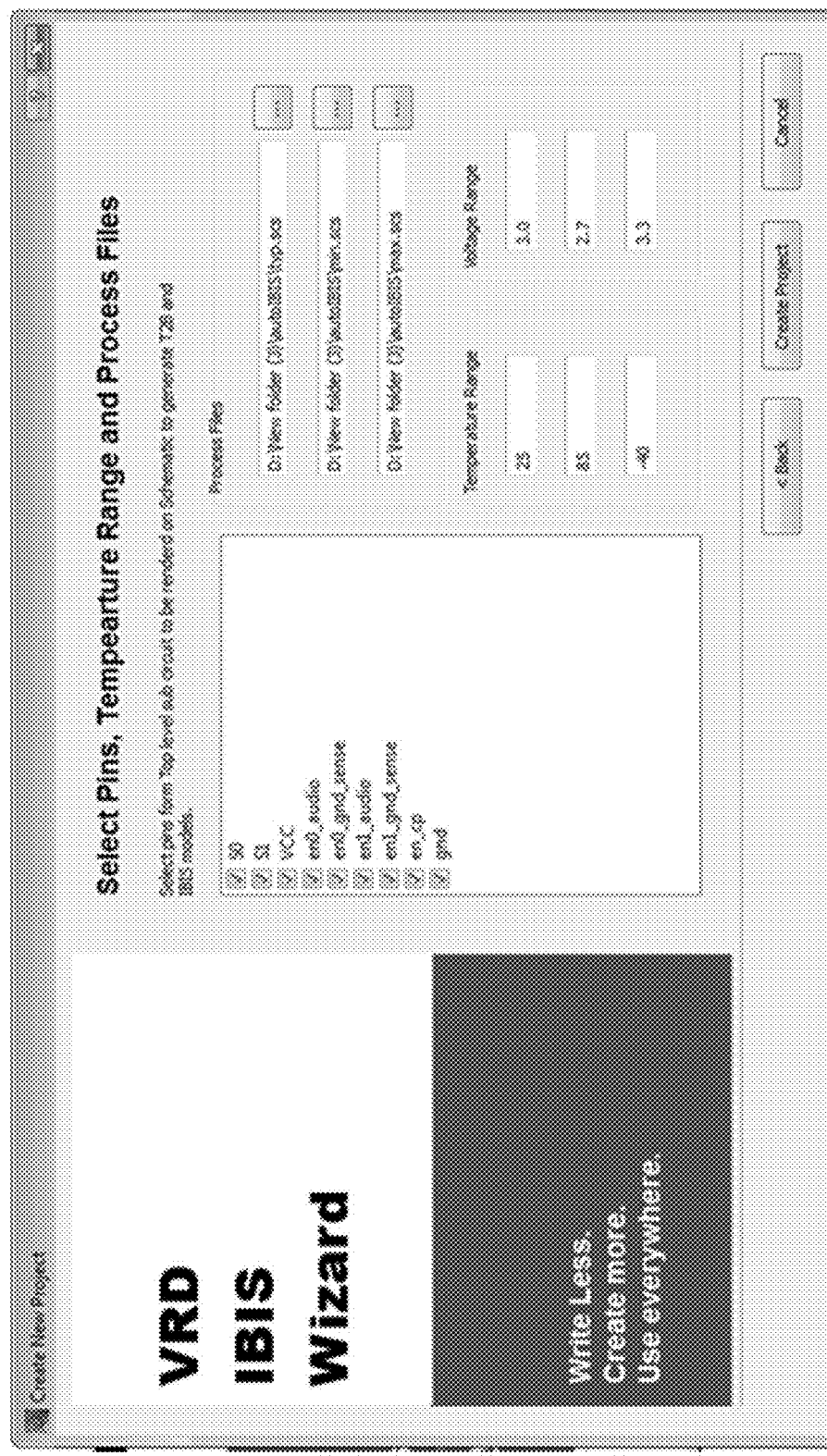
FIG. 21 is a diagram depicting a graphical user interface in accordance with the present disclosure.
Figure 22:
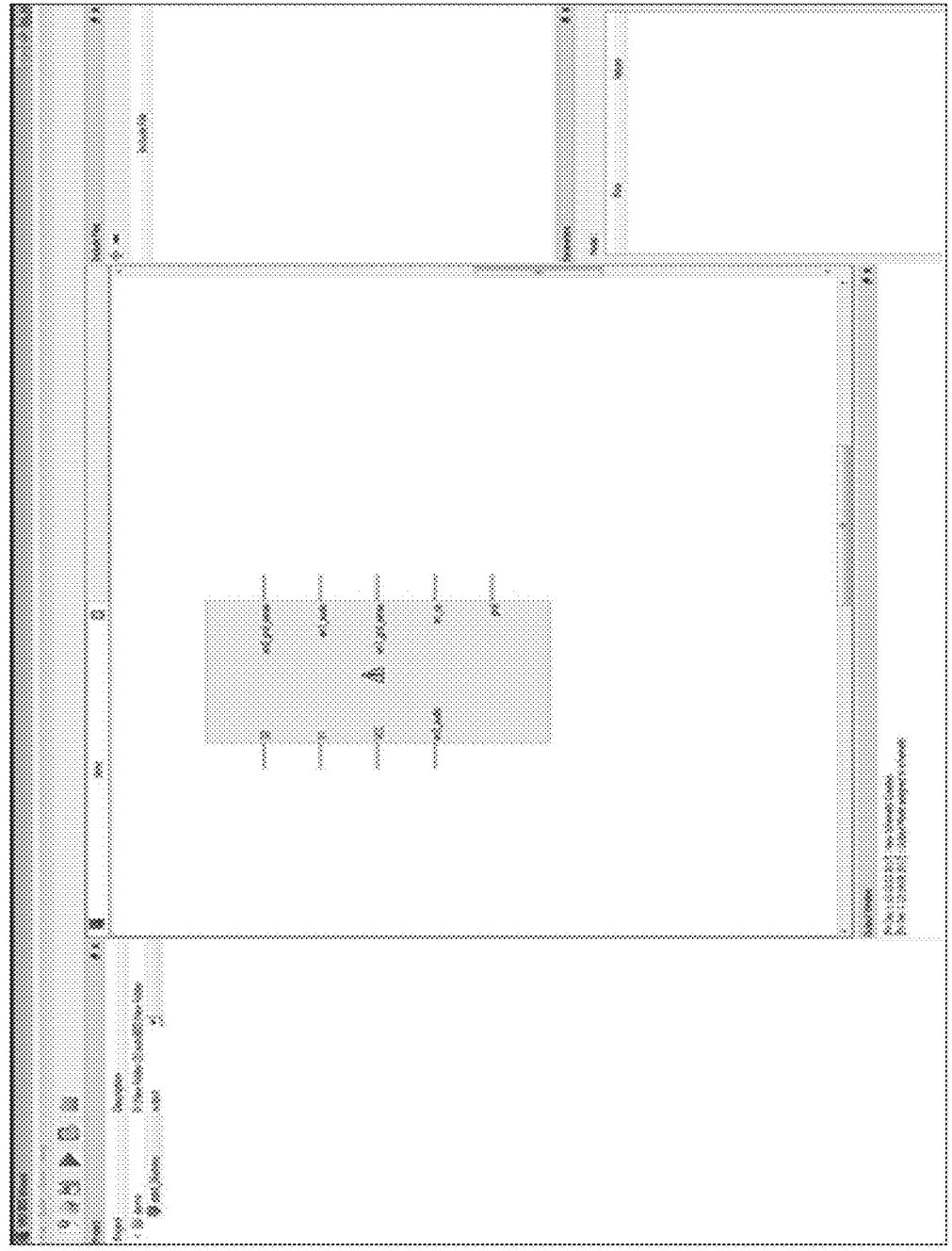
FIG. 22 is a diagram depicting a graphical user interface in accordance with the present disclosure.
Figure 23:
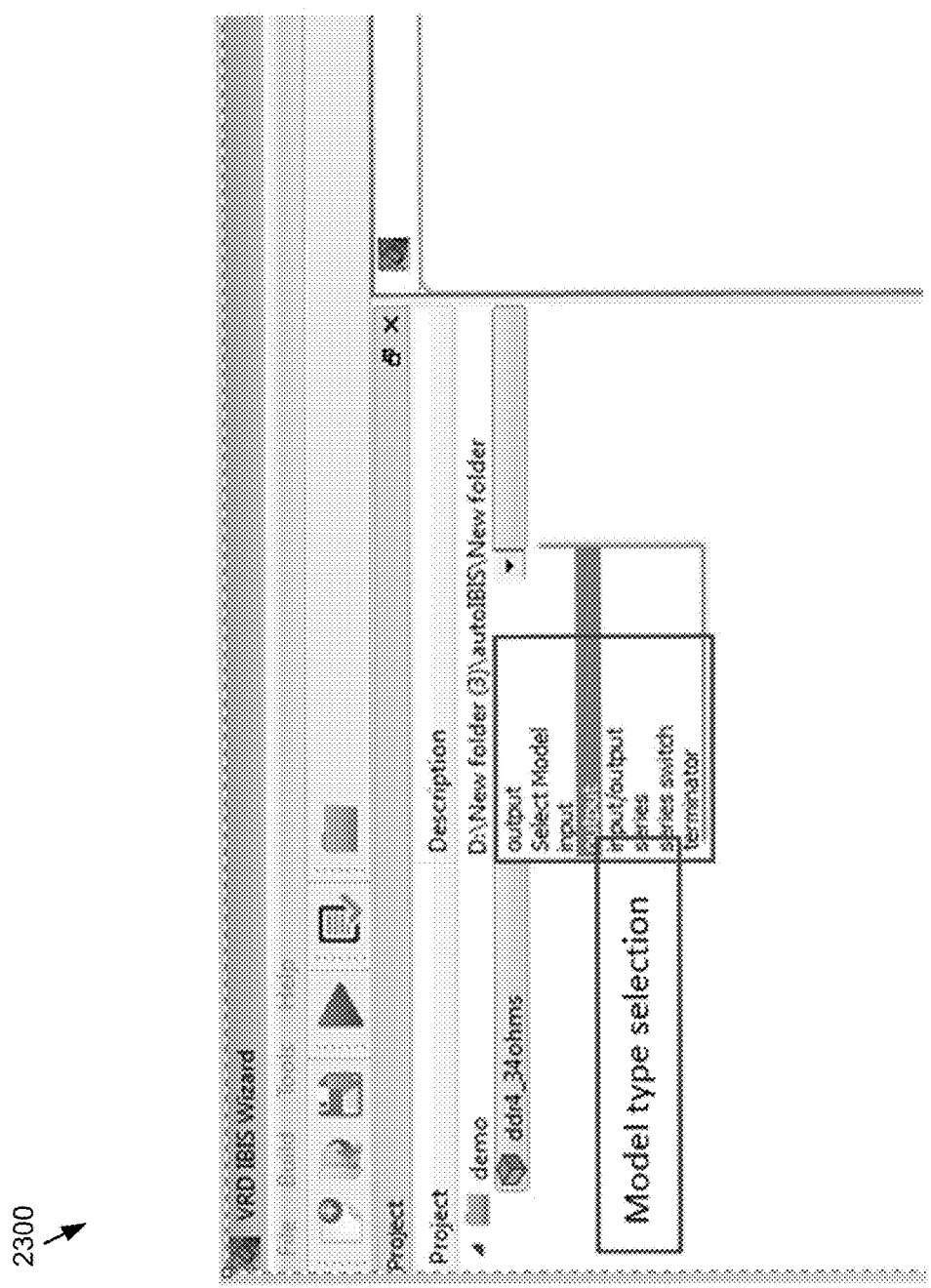
FIG. 23 is a diagram depicting a graphical user interface in accordance with the present disclosure.
Figure 24:
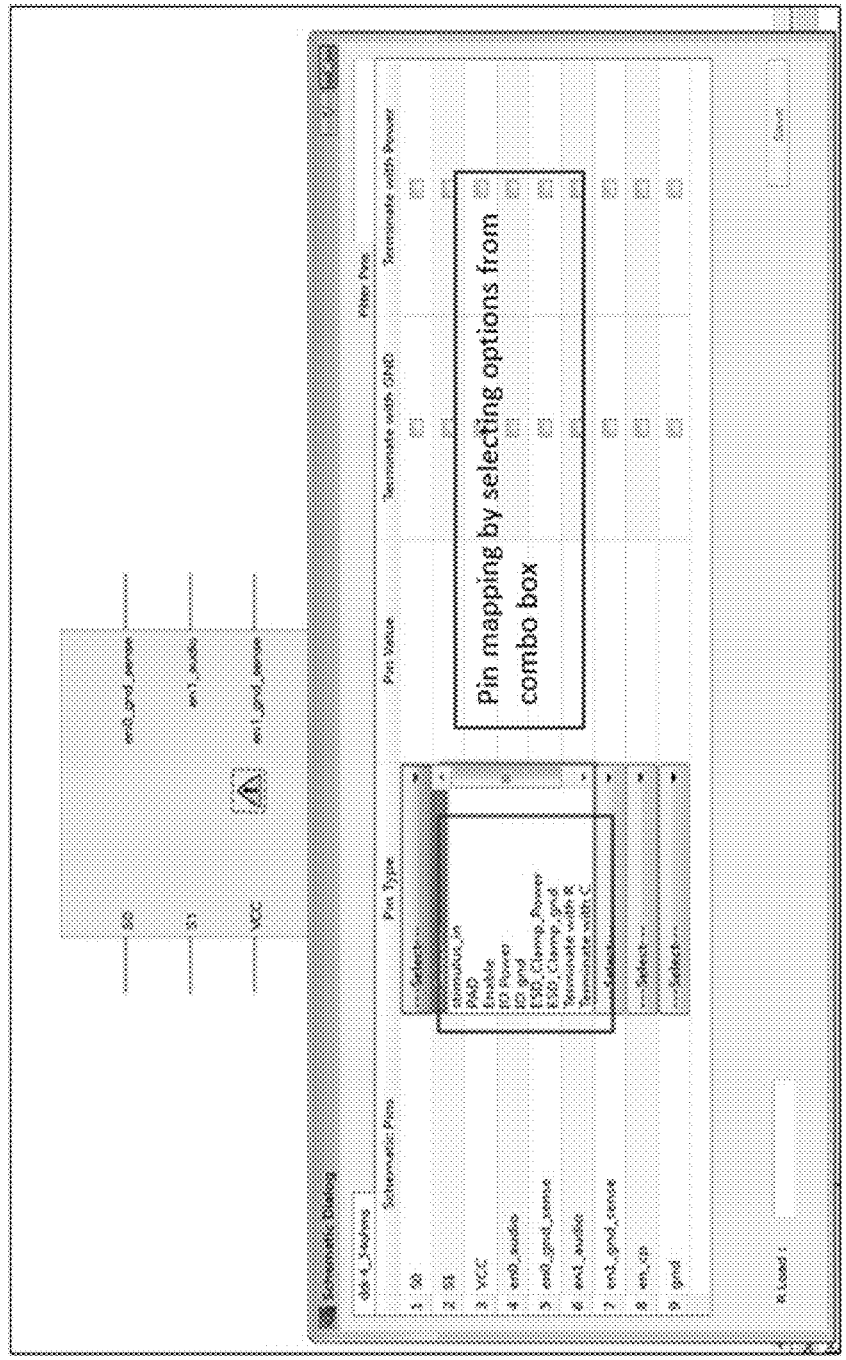
FIG. 24 is a diagram depicting a graphical user interface in accordance with the present disclosure.
Figure 25:
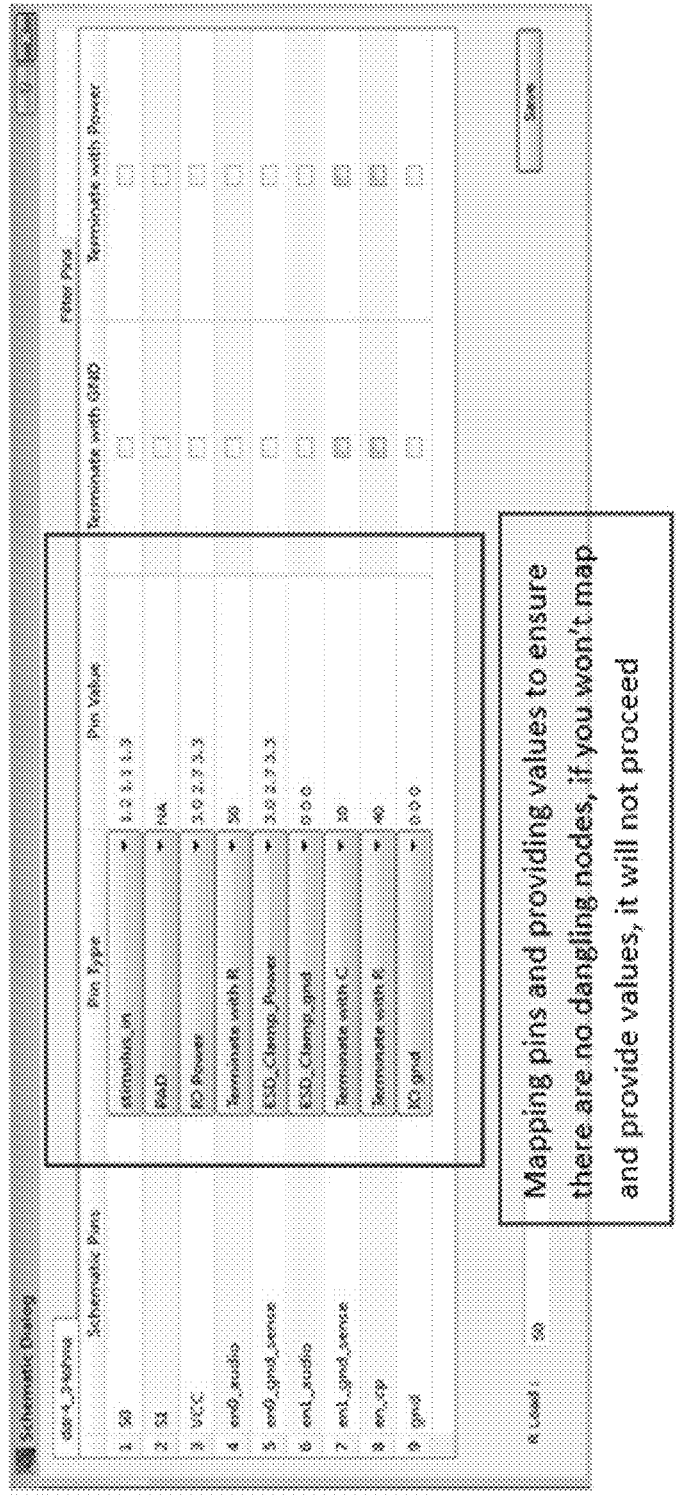
FIG. 25 is a diagram depicting a graphical user interface in accordance with the present disclosure.

Referring now to FIG. 21, an example GUI 2100 shows an example by which model generation process 10 may be configured to populate all of the nodes (S0, S1, VCC) associated with the subckt. The system also allows for the specification of the process files, voltage and temperature range, etc. FIG. 22 shows an example GUI 2200 where a schematic has been rendered on the canvas. FIG. 23 shows an example GUI 2300 various examples of model types that may be selected, some of which may include, but are not limited to, input, output, input/output, select model, series, series/switch, termination, etc. FIG. 24 shows an example GUI 2400 that depicts an example pop-up dialog GUI. In operation, the GUI may be displayed and the list may be populated with one or more questions to initialize the values of pins.

Figure 26:
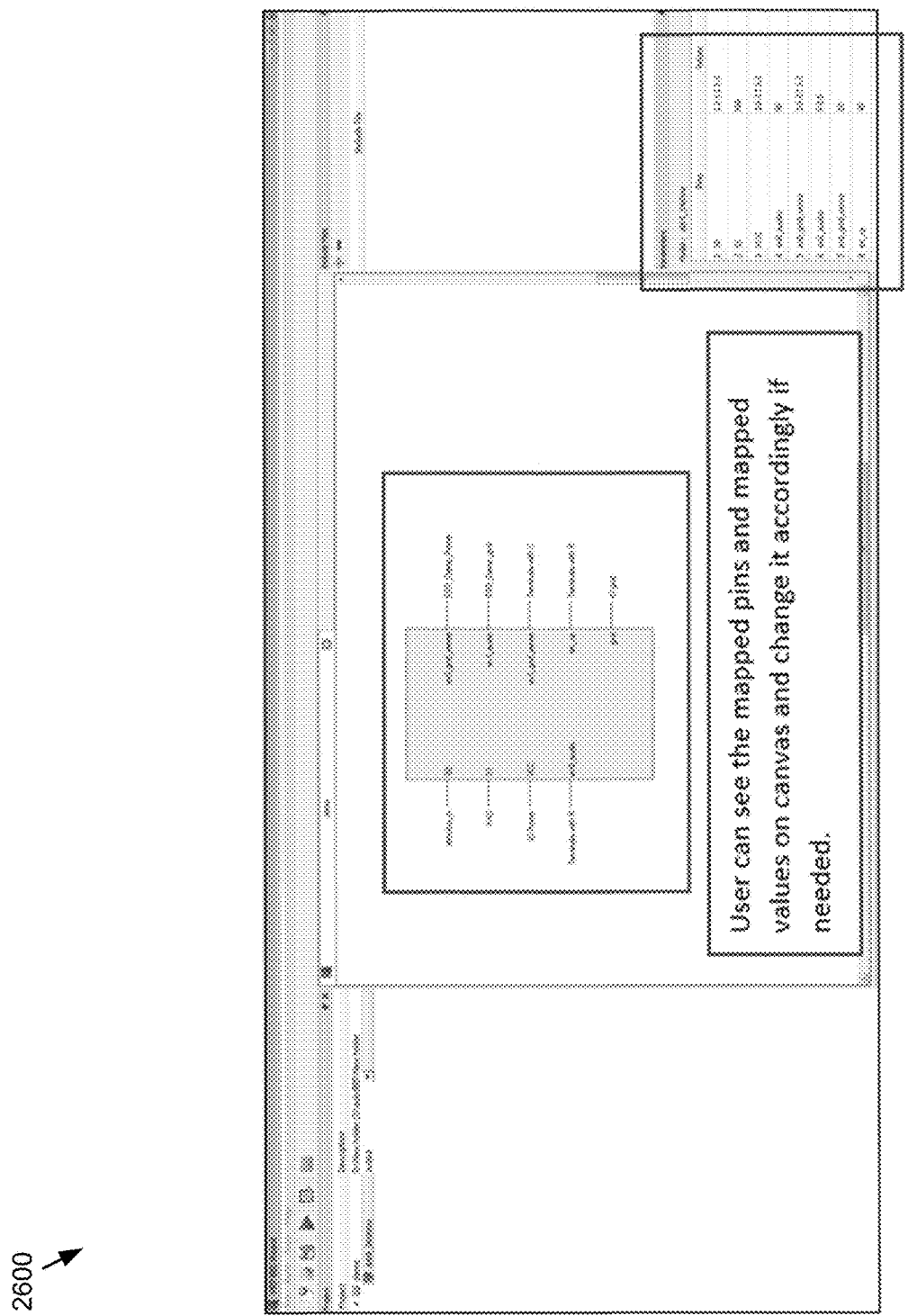
FIG. 26 is a diagram depicting a graphical user interface in accordance with the present disclosure.
Figure 27:
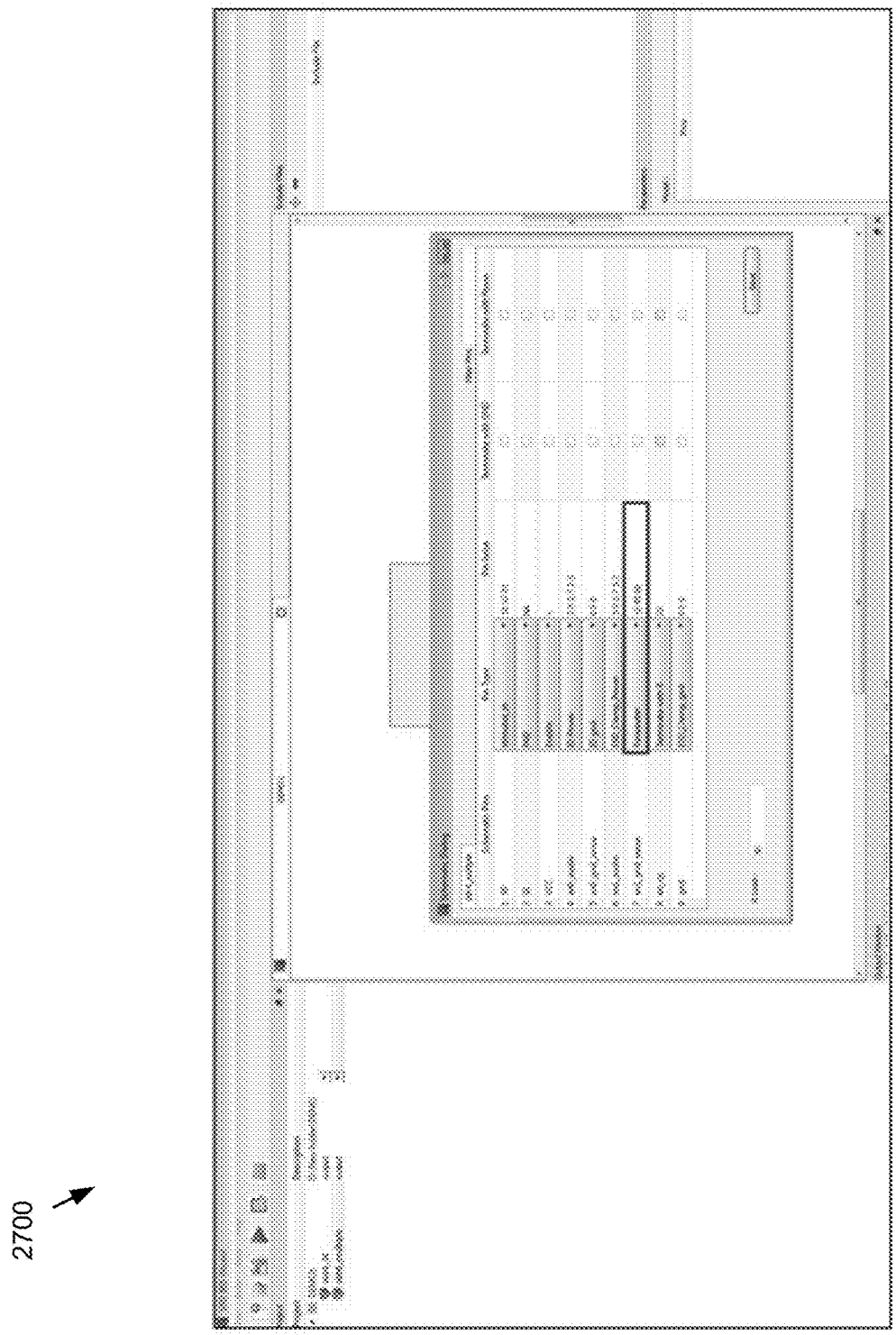
FIG. 27 is a diagram depicting a graphical user interface in accordance with the present disclosure.
Figure 28:
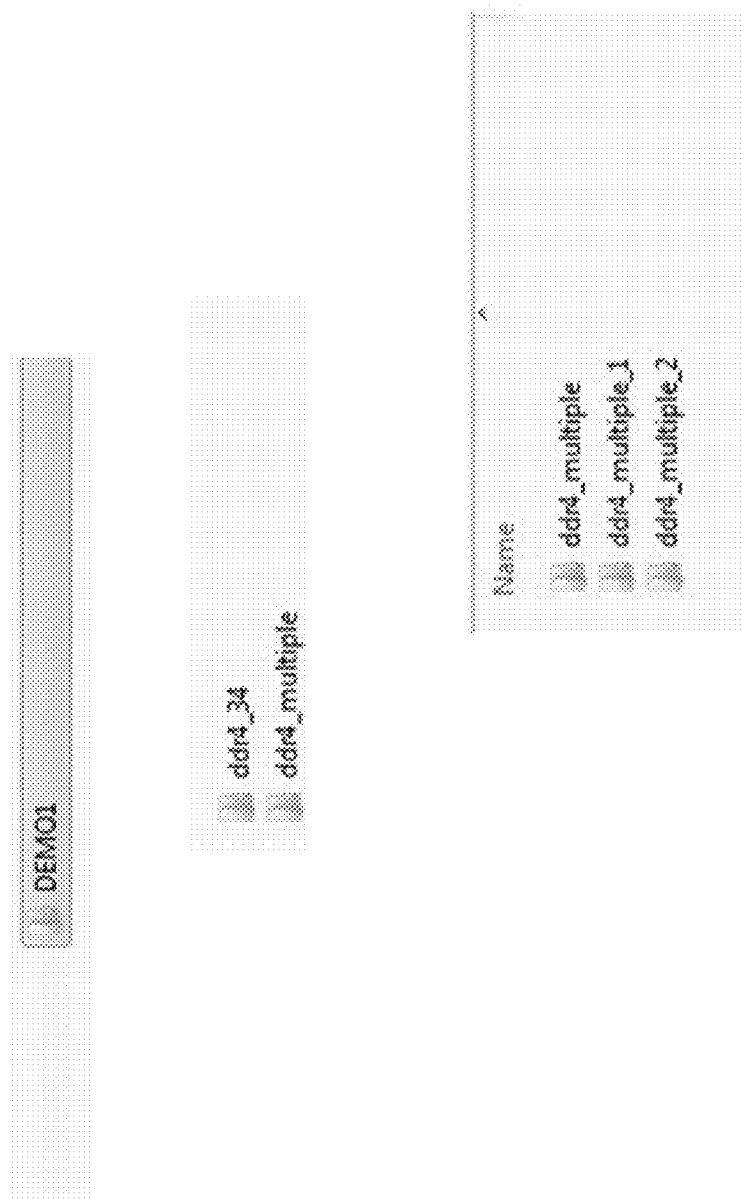
FIG. 28 is a diagram depicting a graphical user interface in accordance with the present disclosure.

Referring now to FIGS. 25-28, an example GUI 2500 shows an example dialog after the pin type assignment and pin values have been added. FIG. 26 shows an example GUI 2600 where the schematic has been updated with pin type and values. FIG. 27 shows an example GUI that allows for the generation of multiple models using the same schematic by using the "parameter" pin type. In this example, one model may be generated for each of the values. For example, for values 12, 45 & 60 three IBIS models may be generated. FIG. 28 shows an example GUI 2800 that depicts output results and methods of labeling and storing the data. In this example, within the "DEMO1" folder two folders may be created for two schematics namely "ddr4_34" and "ddr4_multiple". Within ddr4_multiple, three folders may be generated wherein each folder corresponds to on IBIS model.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. A computer-implemented method for generating an IBIS (input/output buffer information specification) model from a SPICE (Simulation Program with Integrated Circuit Emphasis) netlist, the computer-implemented method comprising:
   receiving, using a processor, a SPICE netlist associated with an electronic design;
   selecting at least a portion of the SPICE netlist for analysis;
   reading, using at least one processor, the selected portion of the SPICE netlist including reviewing the SPICE netlist for at least one of a floating node, an unassigned parameter, and an unresolved model definition;
   rendering a schematic symbol corresponding to the selected portion of the SPICE netlist;
   providing a user with a visually displayed option, at a graphical user interface, to generate a single IBIS model or multiple IBIS models associated with the schematic symbol;
   performing one or more operations associated with the schematic symbol; and
   translating the one or more operations into simulation commands.

2. The computer-implemented method of claim 1 wherein the schematic symbol includes one or more pins, each pin of the one or more pins representing a node.

3. The computer-implemented method of claim 2 further comprising:
   providing a display that allows for labeling of said each pin with a netlist parameter.

4. The computer-implemented method of claim 3 wherein the labeling includes at least one of input, output, power, ground, and enable labels.

5. The computer-implemented method of claim 2 further comprising:
   providing a display that allows for assigning a voltage or a termination to a floating node.

6. The computer-implemented method of claim 3 further comprising:
   rendering one or more netlist parameters on the schematic symbol.

7. The computer-implemented method claim 6 further comprising:
   allowing a user to specify a parameter value on the schematic symbol.

8. A non-transitory computer-readable storage medium having stored thereon instructions for generating an IBIS (input/output buffer information specification) model from a SPICE (Simulation Program with Integrated Circuit Emphasis) netlist that, when executed by a computing machine cause the computing machine to perform the following operations:
   receiving, using a processor, a SPICE netlist associated with an electronic design;
   allowing, at a graphical user interface, a user to select at least a portion of the SPICE netlist for analysis;
   reading the selected portion of the SPICE netlist including reviewing the SPICE netlist for at least one of a floating node, an unassigned parameter, and an unresolved model definition;
   rendering a schematic symbol corresponding to the selected portion of the SPICE netlist;
   providing a user with a visually displayed option, at a graphical user interface, to generate a single IBIS model or multiple IBIS models associated with the schematic symbol;
   performing one or more operations associated with the schematic symbol; and
   translating the one or more operations into simulation commands.

9. The non-transitory computer-readable storage medium of claim 8 wherein the schematic symbol includes one or more pins, each pin of the one or more pins representing a node.

10. The non-transitory computer-readable storage medium of claim 9 further comprising:
    providing, at the graphical user interface, a display that allows for labeling of said each pin with a netlist parameter.

11. The non-transitory computer-readable storage medium of claim 10 wherein the labeling includes at least one of input, output, power, ground, and enable labels.

12. The non-transitory computer-readable storage medium of claim 9 further comprising:
    providing, at the graphical user interface, a display that allows for assigning a voltage or a termination to a floating node.

13. The non-transitory computer-readable storage medium of claim 10 further comprising:
    rendering one or more netlist parameters on the schematic symbol.

14. The non-transitory computer-readable storage medium of claim 13 further comprising:
    allowing a user to specify a parameter value on the schematic symbol.

15. A system for generating an IBIS (input/output buffer information specification) model from a SPICE (Simulation Program with Integrated Circuit Emphasis) netlist, the system comprising:
    a computing device having at least one processor configured to receive, using a processor, a SPICE netlist associated with an electronic design, the at least one processor further configured to allow, at a graphical user interface, a user to select at least a portion of the SPICE netlist for analysis, the at least one processor further configured to read the selected portion of the SPICE netlist including reviewing the SPICE netlist for at least one of a floating node, an unassigned parameter, and an unresolved model definition and render, at the graphical user interface, a schematic symbol corresponding to the selected portion of the netlist, the at least one processor further configured to provide a user with a visually displayed option, at a graphical user interface, to generate a single IBIS model or multiple IBIS models associated with the schematic symbol, the at least one processor further configured to perform one or more operations associated with the schematic symbol and translate the one or more operations into simulation commands.

16. The system of claim 15 wherein the schematic symbol includes one or more pins, each pin of the one or more pins representing a node.

17. The system of claim 16 further comprising:
at least one processor further configured to provide, at the graphical user interface, a display that allows for labeling of said each pin with a netlist parameter.

18. The system of claim 15 further comprising:
at least one processor configured to render one or more netlist parameters on the schematic symbol and allowing a user to specify a parameter value on the schematic symbol.

* * * * *